United States Patent
Vongkulbhisal et al.

(10) Patent No.: US 12,046,023 B2
(45) Date of Patent: Jul. 23, 2024

(54) UNIFICATION OF MODELS HAVING RESPECTIVE TARGET CLASSES WITH DISTILLATION

(71) Applicant: International Business Machines Corporation, Armonk, NY (US)

(72) Inventors: Jayakorn Vongkulbhisal, Tokyo (JP); Phongtharin Vinayavekhin, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 959 days.

(21) Appl. No.: 17/046,014

(22) PCT Filed: Feb. 25, 2020

(86) PCT No.: PCT/IB2020/051581
§ 371 (c)(1),
(2) Date: Oct. 8, 2020

(87) PCT Pub. No.: WO2020/194077
PCT Pub. Date: Oct. 1, 2020

(65) Prior Publication Data
US 2021/0034985 A1    Feb. 4, 2021

(30) Foreign Application Priority Data
Mar. 22, 2019   (JP) ................... 2019-054237

(51) Int. Cl.
*G06N 3/084*    (2023.01)
*G06F 16/908*   (2019.01)
(Continued)

(52) U.S. Cl.
CPC ........ *G06V 10/7753* (2022.01); *G06F 16/908* (2019.01); *G06N 3/04* (2013.01); *G06N 3/084* (2013.01)

(58) Field of Classification Search
CPC .... G06V 10/7753; G06F 16/908; G06N 3/04; G06N 3/084
See application file for complete search history.

(56) References Cited

U.S. PATENT DOCUMENTS 7,742,641 B2    6/2010   Ivanov
7,873,583 B2    1/2011   Laxman
(Continued)

FOREIGN PATENT DOCUMENTS

CN    106203487 A    12/2016
CN    107423442 A    12/2017
(Continued)

OTHER PUBLICATIONS

"Reply to Examination Report", Application No. GB2114233.6, Nov. 30, 2022, 10 pages.
(Continued)

*Primary Examiner* — Casey R. Garner
(74) *Attorney, Agent, or Firm* — Stephen R. Yoder

(57) ABSTRACT

Generating soft labels used for training a unified model is achieved by unification of models having respective target classes with distillation. A collection of samples is prepared. Predictions are generated by individual trained models. Individual trained models have an individual class set to form a unified class set that includes target classes. The unified soft labels are estimated for each sample over the target classes in the unified class set from the predictions using a relation connecting a first output of each individual trained model and a second output of the unified model. The unified soft labels are output to train a unified model having the unified class set.

22 Claims, 9 Drawing Sheets

(51) Int. Cl.
*G06N 3/04* (2023.01)
*G06V 10/774* (2022.01)

(56) References Cited

U.S. PATENT DOCUMENTS

| | | | |
|---|---|---|---|
| 8,954,358 B1 | 2/2015 | Zhang | |
| 2006/0120609 A1* | 6/2006 | Ivanov | G06V 10/811 |
| | | | 382/190 |
| 2017/0011738 A1 | 1/2017 | Senior | |
| 2017/0032276 A1 | 2/2017 | Sukhanov | |
| 2017/0083829 A1* | 3/2017 | Kang | G06N 3/045 |
| 2019/0034764 A1* | 1/2019 | Oh | G06N 3/08 |
| 2020/0218937 A1 | 7/2020 | Marco | |

FOREIGN PATENT DOCUMENTS

| | | |
|---|---|---|
| CN | 109087303 A | 12/2018 |
| JP | 2010092266 A | 4/2010 |

OTHER PUBLICATIONS

"Notice of Reasons for Refusal", Application number: Japanese Patent Application No. 2022-501381, Date of Drafting: Sep. 22, 2023, 4 pages.

Hinton et al., "Distilling the Knowledge in a Neural Network", arXiv:1503.02531 [stat.ML] Mar. 9, 2015, 9 pages.

Lopes et al., "Data-Free Knowledge Distillation for Deep Neural Networks", 31st Conference on Neural Information Processing Systems (NIPS 2017), Long Beach, CA, USA, 8 pages.

Patent Cooperation Treaty, PCT, Notification of Transmittal of the International Search Report and The Written Opinion of the International Searching Authority, or the Declaration, International Application No. PCT/IB2020/051581, International Filing Date: Feb. 25, 2020, 10 pages.

"Patents Act 1977: Examination Report under Section 18(3)", Application No. GB2114233.6, Oct. 5, 2022, 7 pages.

* cited by examiner

UNIFICATION OF MODELS HAVING RESPECTIVE TARGET CLASSES WITH DISTILLATION

BACKGROUND

The present disclosure, generally, relates to machine learning, more particularly, to a computer-implemented method, a computer system and a computer program product for unifying models having respective sets of target classes.

The success of the machine learning in classification tasks has been largely enabled by the availability of big datasets. Having more training data helps to improve accuracy of the classification tasks. As the technology becomes more pervasive, data collection is transitioning towards more distributed settings where the data is sourced from multiple entities and then combined to train a classifier in a central node.

However, in many cases, transfer of data between entities is limited due to privacy concerns, or resource restrictions such as network resources. In addition, each data source may not be able to collect sufficient training data of all target classes due to different data availability. These limitations hamper the unification of knowledge from different sources.

This situation has led to multiple works that propose to learn classifiers without directly sharing data. Such works include distributed optimization, consensus based training, federated learning, knowledge distillation, and data-free knowledge distillation for deep neural networks. However, these conventional approaches assume that target classes of all models are the same. However, there are many cases where it is not possible to make every model to have the same target classes due to data availability, for example.

SUMMARY

According to an embodiment of the present invention, a computer-implemented method for generating unified soft labels is provided. The computer-implemented method includes preparing a collection of samples. The computer-implemented method also includes obtaining, for each sample, a plurality of predictions generated by a plurality of individual trained models, in which each individual trained model has an individual class set to form at least partially a unified class set that includes a plurality of target classes. The computer-implemented method further includes estimating, for each sample, unified soft labels over the target classes in the unified class set from the plurality of the predictions using a relation connecting a first output of each individual trained model and a second output of the unified model. The computer-implemented method also includes outputting the unified soft labels to train a unified model having the unified class set.

According to the computer-implemented method of the embodiment of the present invention, since the unified soft labels to be used for training the unified model are estimated from the predictions generated by the individual trained models in a manner consistent with the output of the unified model, it is possible to transfer knowledge of the individual trained models to the unified model even though the individual trained models have different partial sets of target classes in the unified class set of the unified target model.

According to an embodiment of the present invention, the computer-implemented method includes feeding each sample into the unified model to infer predicted values over the target classes in the unified class set as the second output. The computer-implemented method includes also updating the unified model based on a loss function between the unified soft labels and the predicted values for each sample. The computer-implemented method further includes storing the unified model updated. Thereby, the unified model trained according to the computer-implemented method of the preferable embodiment of the present invention shows high performance, especially, comparable to a model that has been directly trained in a centralized and supervised manner with training data used for training the individual trained models.

According to an embodiment of the present invention, the relation indicates equivalence between each prediction value in the first output of one individual trained model and a corresponding prediction value in the second output of the unified model normalized by the individual class set of the one individual trained model. Thereby, a provision of improper supervision for missing target classes in the prediction of the individual trained model is avoided and it is possible to prevent the performance degradation of the unified model due to such improper supervision.

According to an embodiment of the present invention, the loss function is weighted by weightings over the target classes in the unified class set. Each weighting for one target class is computed in a manner based on a statistic of the unified soft labels on the one target class through the collection. Thereby, bias in the training data for the individual trained models that may favor certain classes more than others can be prevented from transferring to the unified model.

According to an embodiment of the present invention, the unified soft labels are estimated by solving a problem of optimizing an objective function with respect to a distribution q corresponding to the second output of the unified model. The objective function measures an error between a plurality of reference distributions $p_i$ corresponding to the plurality of the predictions and a plurality of normalized distributions $q_{\tilde{i}}$, each of which is obtained by normalizing the distribution q over target classes in each individual class set.

According to an embodiment of the present invention, the unified soft labels are estimated by solving a problem of optimizing an objective function with respect to at least an output vector u representing the second output q of the unified model as variables in a manner based on matrix factorization. The unified soft labels are represented in a form of probability or logits.

According to an embodiment of the present invention, the computer-implemented method includes receiving, for each of the plurality of the individual trained models, (i) a content of the individual trained model itself or (ii) a soft label collection obtained by feeding each sample into the individual trained model, together with a content of the individual class set. Thereby, data transfer of training data used to train the individual trained model is not required. The content of the individual trained model and the soft label collection obtained from the individual trained model are not raw data and are generally more compact than its training data. Also there is less restriction on the model architecture of the individual trained model. Thus, it is preferable in a situation where there is at least one of model architecture, computational, data availability and confidentiality constraints.

According to an embodiment of the present invention, a computer-implemented method for training a unified model is provided. The computer-implemented method includes preparing a collection of samples. The computer-implemented method also includes obtaining, for each sample, a plurality of predictions generated by a plurality of individual trained models, in which each individual trained model has an individual class set to form at least partially a unified class set that includes a plurality of target classes. The computer-implemented method includes further updating the unified model having the unified class set using the plurality of the predictions for each sample and a relation connecting a first output of each individual trained model and a second output of the unified model over the target classes in the unified class set.

According to the computer-implemented method of the other embodiment of the present invention, since the unified model is updated using the outputs generated by the plurality of the individual trained models in a manner consistent with the output of the unified model, it is possible to transfer knowledge of the individual trained models to the unified model even though the individual trained models have different partial sets of target classes in the unified class set of the unified model. The unified model trained according to the computer-implemented method of the other embodiment of the present invention shows high performance, especially, comparable to a model that has been directly trained in a centralized and supervised manner with training data of individual models. Furthermore, it is possible to prevent accumulation of errors when estimating the unified soft labels from propagating toward the training of the unified model.

According to an embodiment of the present invention, the computer-implemented method also includes feeding each sample into the unified model to infer predicted values over the target classes in the unified class set as the second output, in which the unified model is updated using the predicted values. The computer-implemented method further includes storing the unified model updated.

According to an embodiment of the present invention, the unified model includes a neural network and the unified model is updated by back-propagating a loss throughout the neural network, in which the loss measures an error between a plurality of reference distributions $p_i$ corresponding to the plurality of the predictions and a plurality of normalized distributions $q_i$ obtained by normalizing a distribution q over target classes in each individual class set and the distribution q is obtained as the predicted values inferred by the unified model.

According to an embodiment of the present invention, the unified model includes a neural network and the unified model is updated by back-propagating a loss throughout the neural network, in which the loss is obtained by solving a problem of optimizing an objective function with an output vector u representing the second output of the unified model and other variables in a manner based on matrix factorization and the output vector u is obtained as the predicted values inferred by the unified model and fixed in the problem.

Computer systems and computer program products relating to one or more aspects of the present invention are also described and claimed herein.

Additional features and advantages are realized through the techniques of the present invention. Other embodiments and aspects of the invention are described in detail herein and are considered a part of the claimed invention.

BRIEF DESCRIPTION OF DRAWINGS

The subject matter, which is regarded as the invention, is particularly pointed out and distinctly claimed in the claims at the conclusion of the specification. The foregoing and other features and advantages of the invention are apparent from the following detailed description taken in conjunction with the accompanying drawings in which:

DESCRIPTION OF EMBODIMENTS

Therefore, there is a need for a technique capable of training a unified model from a plurality of individual models even in a case where the individual trained models have respective partial sets of target classes different from a unified class set of the unified model.

Now, the present invention will be described using particular embodiments, and the embodiments described hereafter are understood to be only referred to as examples and are not intended to limit the scope of the present invention.

One or more embodiments according to the present invention are directed to computer-implemented methods, computer systems and computer program products for generating unified soft labels, which may be used for training a student unified model having a set of target classes (referred to as a unified class set), by using data obtained from a plurality of individual teacher models, which may have different sets of target classes (referred to an individual class set), respectively.

One or more other embodiments according to the present invention are directed to computer-implemented methods, computer systems and computer program products for training a student unified model having a unified class set of target classes, by using data obtained from a plurality of individual teacher models having respective individual class sets.

First, with reference to a series of FIGS. 1-5, a computer system and a method for training a student unified model with a plurality of individual teacher models in a framework of knowledge distillation, in which the student and the teacher models are classifiers with respective target classes and data obtained from the individual teacher classifiers is used to estimate unified soft labels for the student unified classifier, according to exemplary embodiments of the present invention, will be described.

Figure 6:
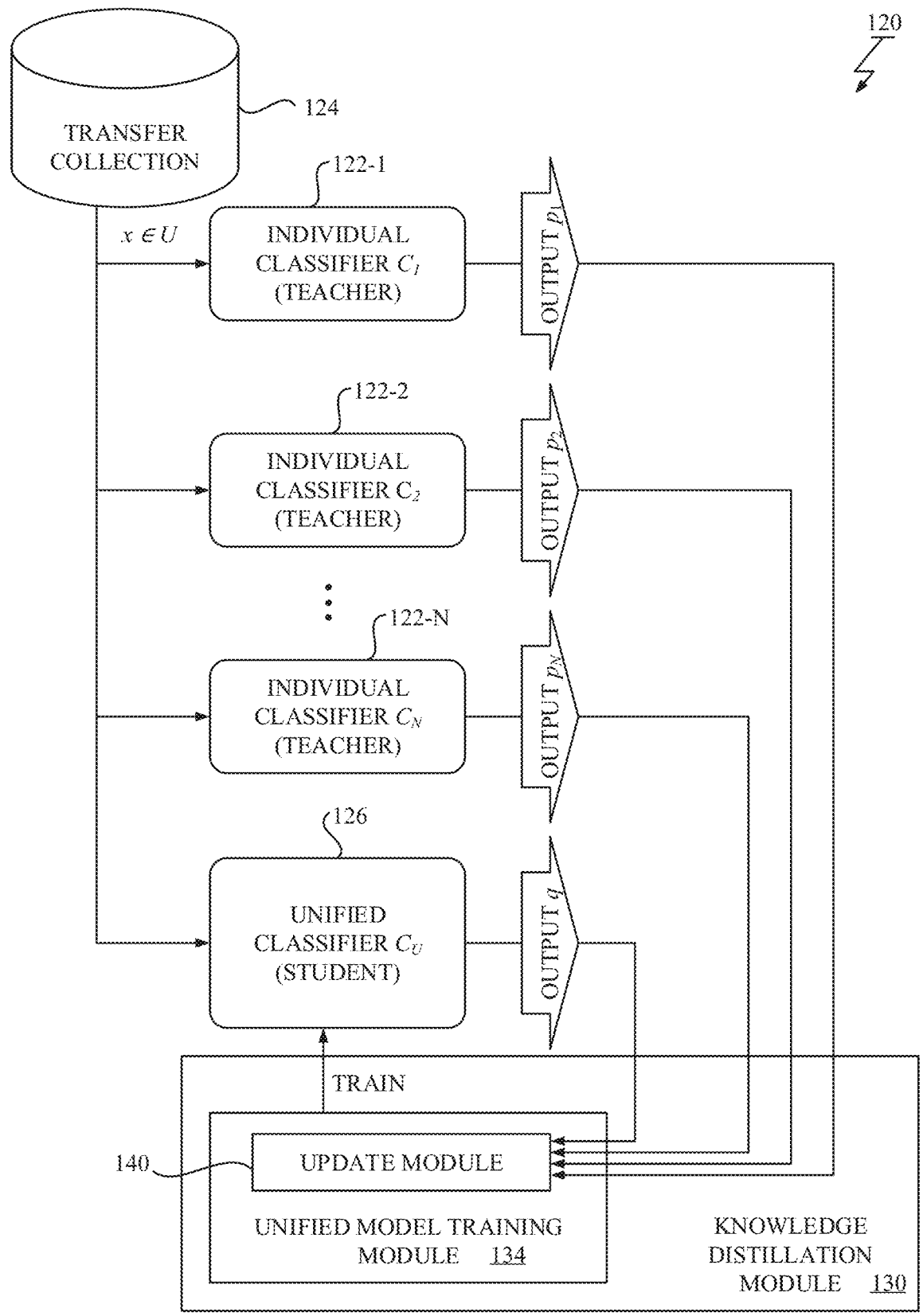
FIG. 6 illustrates a block diagram of a knowledge distillation system according to further other exemplary embodiment of the present invention.
Figure 7:
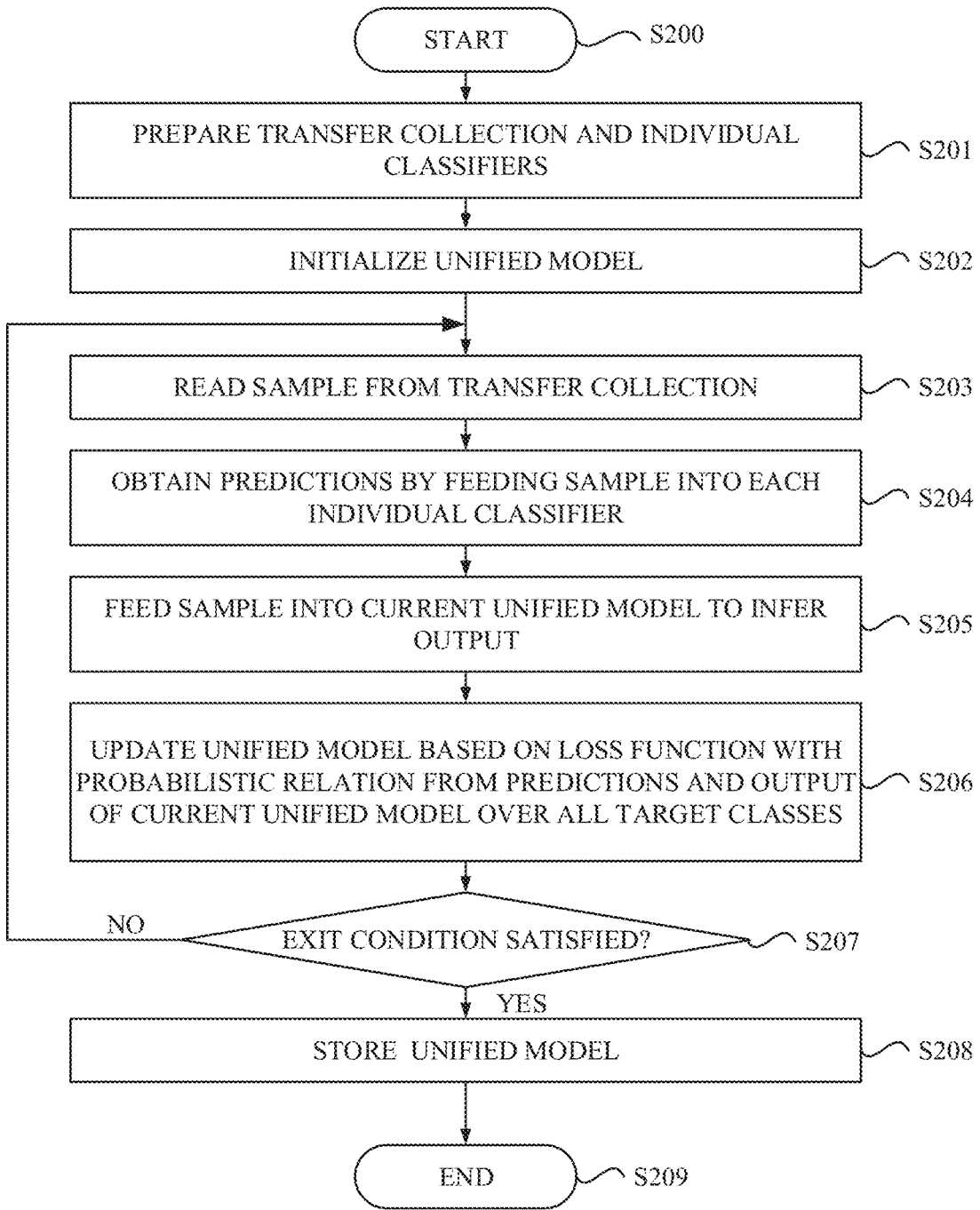
FIG. 7 is a flowchart depicting a knowledge distillation process for training a unified classifier with individual classifiers according to the further other exemplary embodiment of the present invention.

Then, with reference to a series of FIGS. 6 and 7, a computer system and a method for training a student unified model with a plurality of individual teacher models in a framework of knowledge distillation, in which the student and the teacher models are classifiers with respective target classes and data obtained from the individual teacher classifiers is used to update the student unified classifier without having to estimate the unified soft labels first, according to other exemplary embodiments of the present invention, will be described.

Furthermore, with reference to FIG. 8, experimental studies on image classification with a novel knowledge distillation according to the exemplary embodiments of the present invention will be described. Finally, referring to FIG. 9, a hardware configuration of a computer system according to one or more embodiments of the present invention will be described.

Figure 1:
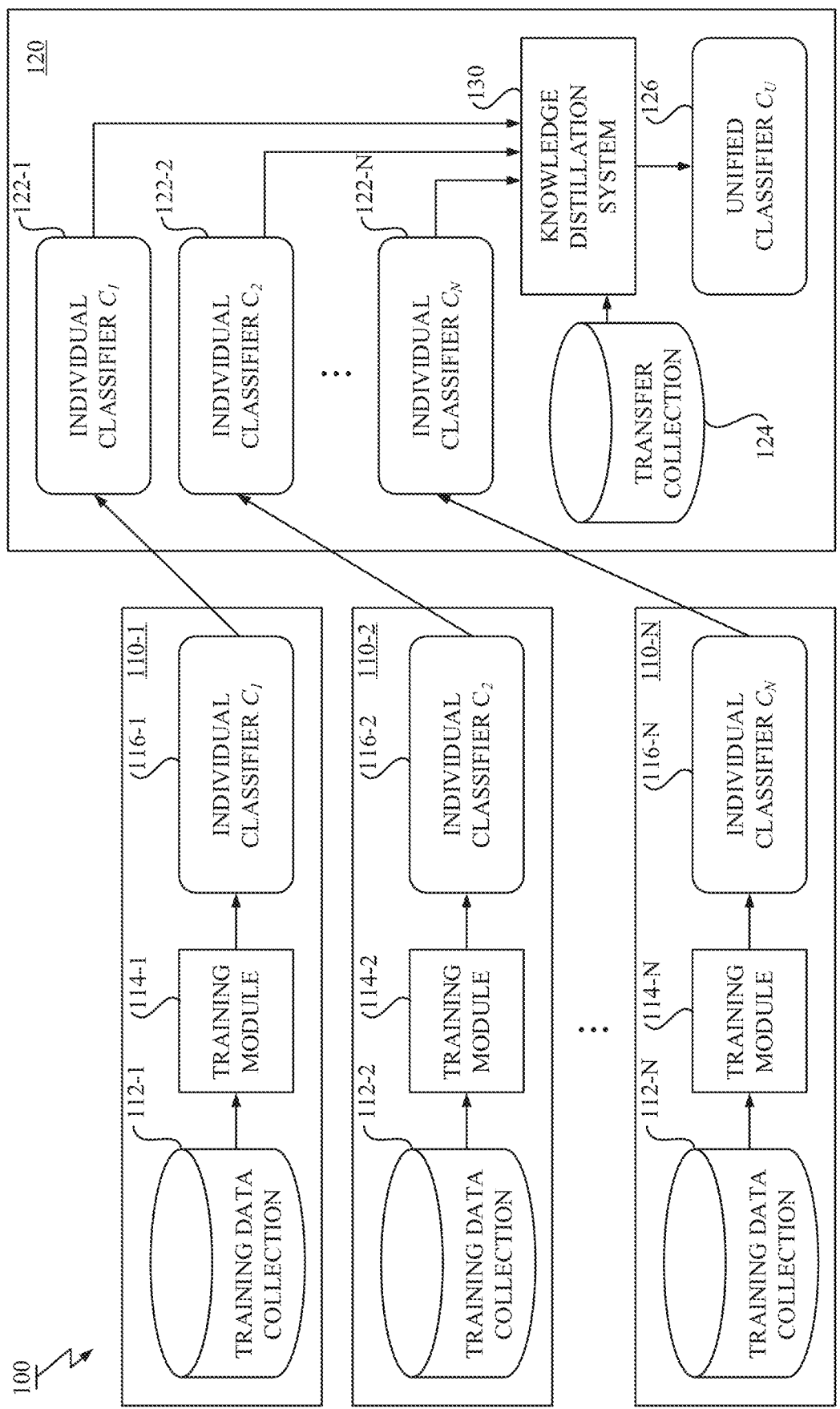
FIG. 1 illustrates a training scheme with a knowledge distillation system according to an exemplary embodiment of the present invention.
Figure 2:
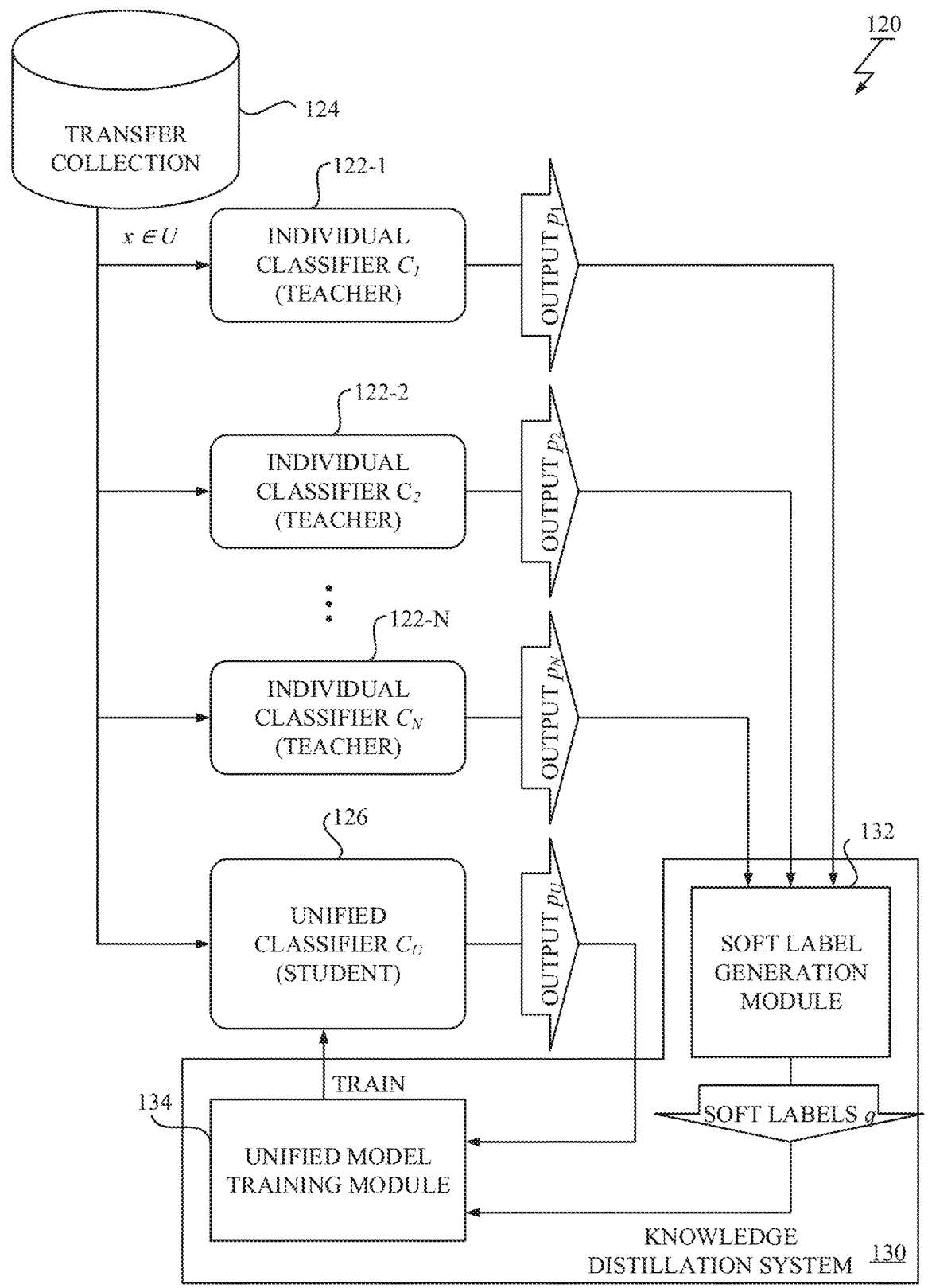
FIG. 2 illustrates a block diagram of the knowledge distillation system and related components around the knowledge distillation system according to the exemplary embodiment of the present invention.

With reference to FIG. 1 and FIG. 2, a knowledge distillation system 130 for image classification according to an exemplary embodiment of the present invention is described.

FIG. 1 illustrates a training scheme using the knowledge distillation system 130. As shown in FIG. 1, there are a central computing system 120 and a plurality of data sources 110-1~110-N.

In FIG. 1, components of each data source 110 are depicted. In each data source 110, there are a training data collection 112, a training module 114 and an individual classifier 116. In each data source 110, the individual classifier 116 is trained by the training module 114 using the training data collection 112. Generally, each data source 110 is managed by an entity with their rights and obligations and such entity may include a private person, a company, an enterprise, an educational institution, a medical institution, to name but a few.

Each training data collection 112 stores a collection of training data, each of which includes an image and a class label assigned to the image. The training data stored in the training data collection 112 may include privacy and/or confidential information to be kept within the data source 110. The diversity and the amount of the training data stored in the training data collections 112-1~112-N are generally different from each other due to their data availability. Note that in the described embodiment, each training data includes the image to which the class label is assigned. However, in other embodiment with a different classification task, the data included in each training data is not limited to the image, and may be other data types, e.g., audio recordings for speech recognition task.

Each individual classifier 116 may be any one of known classification models, including, but not limited to, neural network based classification models (e.g., DNN (Deep Neural Network), CNN (Convolutional Neural Network), RNN (Recurrent Neural Network), and their variants), decision tree or forest based classification models (e.g., random forest), nearest neighbors based classification models, and support vector machine (SVM) based classification models (the standard SVM can be modified to work as the individual classifier 116). Also each individual classifier 116 may not be limited to a single classification model, and may be an ensemble of a plural classification models (e.g., bagging, boosting, mixture-of-expert, etc.). The individual classifier 116 is trained by the training module 114 so as to predict probability of an image belonging to each target class. These individual classifiers 116-1~116-N may have different architectures and may be trained to classify different sets of target classes (the individual class set), and hence are referred to as "heterogeneous classifiers".

Each training module 114 implements a learning algorithm appropriate for a corresponding architecture of the individual classifier 116 to be trained. Each training module 114 is configured to train the individual classifier 116 by using the training data stored in the training data collection 112.

Referring to FIG. 1, components of the central computing system 120 are also depicted. The central computing system 120 includes a transfer collection 124, the knowledge distillation system 130 and a unified classifier 126. In the central computing system 120, the unified classifier 126 is trained by the knowledge distillation system 130 using the transfer collection 124. The central computing system 120 is managed by an entity that may be different from the entities of the data sources 110-1~110-N, thus, data transfer from the training data collections 112-1~112-N to the central computing system 120 is typically restricted.

The purpose of the novel knowledge distillation according to the exemplary embodiment of the present invention is to unify the knowledge of the data sources 110-1~110-N into a single unified model without transferring the training data distributed over the multiple data sources 110-1~110-N, which may cause privacy and/or confidentiality concerns.

In this training scheme, to integrate the knowledge distributed over the multiple data sources 110-1~110-N, each entity is only requested to forward their trained individual classifiers 116-1~116-N and its class names to the central computing system 120. In the central computing system 120, the knowledge distillation system 130 receives the transferred individual classifiers 122-1~122-N and runs them on its resources. Then, the knowledge distillation system 130 trains the unified classifier 126 by leveraging the transferred individual classifiers 122-1~122-N with the transfer collection 124.

Since the knowledge of the data sources 110-1~110-N are accumulated in the trained individual classifiers 122-1~122-N, it is possible to unify the distributed knowledge into the single unified classifier 126 so that it can classify all target classes of all individual classifiers 116-1~116-N.

Generally, the content of the individual classifier 116 is more compact than a whole of the training data stored in the training data collection 112. So, this training scheme is preferable in a situation where there exists a resource limitation such as a bandwidth restriction (e.g., very large datasets).

FIG. 2 illustrates a block diagram of the knowledge distillation system 130 and related components around the knowledge distillation system 130. As shown in FIG. 2, the knowledge distillation system 130 includes a soft label generation module 132 and a unified model training module 134. There are the unified classifier 126 to be trained as a student model and the plurality of the individual classifiers 122-1~122-N that have been already trained as teacher models.

The transfer collection 124 stores a collection of transfer data, each of which may include an image when the image classification is targeted. The transfer data is data used for transferring knowledge to the unified classifier 126. The transfer data (or a sample) is drawn from the transfer collection 124 and fed into each of the teacher and student classifiers 122,126 as an input. In a particular embodiment, the image stored in the transfer collection 124 is not required to be assigned a hard label and may not include privacy and confidential information. Any image in public image datasets and/or other image datasets collected for the novel knowledge distillation may be used as the transfer data. Note that in the described embodiment, each transfer data includes the image. However, in other embodiments with a different classification task, each transfer data may include other data types, e.g., audio recordings for speech recognition task.

The unified classifier 126 may be any one of known neural network based classification models (e.g., DNN, CNN, RNN, and their variants), decision tree or forest based classification models (e.g., random forest), nearest neighbors based classification models, and SVM based classification models (the standard SVM can be modified to work as the unified classifier 126). The unified classifier 126 is trained by the knowledge distillation system 130 so as to predict probability of an image belonging to each target class. The unified classifier 126 may have an architecture different from the individual classifiers 122-1~122-N and may be trained to classify a set of target classes (the unified class set) different from those of the individual classifiers 122-1~122-N. The unified class set may be a union of the individual class sets of the individual classifiers 122-1~122-N, and thus include all members in the individual class sets.

The knowledge distillation system 130 is configured to prepare the transfer collection 124 and feed each transfer data drawn from the transfer collection 124 into the individual classifiers 122-1~122-N. Each individual classifier 122 infers probability of the image of the transfer data belonging to each target class and generates a prediction as an output. The prediction may include probabilities or logits over target classes in their individual class set.

The soft label generation module 132 is configured to obtain, for each transfer data (or sample), the predictions generated by the individual classifiers 122-1~122-N. The plurality of the predictions obtained from the plurality of the individual classifiers 122-1~122-N is used as primary data to generate unified soft labels for knowledge distillation. The soft label generation module 132 is further configured to estimate, for each transfer data (or sample), unified soft labels over the target classes in the unified class set from the predictions using a probabilistic relation, which is newly derived herein. The probabilistic relation connects or relates an output of each individual classifier 122 and an output of the unified classifier 126. More detail about the probabilistic relation will be described later. After obtaining the unified soft labels, the soft label generation module 132 outputs the unified soft labels to the unified model training module 134. The unified soft labels are called as 'soft' labels since the class identities are not as deterministic as the one hot hard label.

The unified model training module 134 implements a learning algorithm appropriate for a corresponding architecture of the unified classifier 126 and is configured to train the unified classifier 126 by using the unified soft labels estimated for each transfer data in a supervised manner. When a neural network based model is employed as the unified classifier 126, backpropagation algorithm may be used.

More specifically, the unified model training module 134 is configured to feed each transfer data (or a sample) into the unified classifier 126 to infer probability of the image of the transfer data belonging to each target class and to obtain an output. The output of the unified classifier 126 may include probabilities or logits over target classes in the unified class set. The unified model training module 134 is configured to further update the unified classifier 126 (its parameters) based on a loss function between the unified soft labels and the output of the unified classifier 126 for each sample, iteratively. When the training process is complete the unified model training module 134 stores the unified classifier 126 into an appropriate storage device.

Hereinafter, further referring to FIG. 2, more detail about the novel knowledge distillation is described. Here, the novel knowledge distillation with the heterogeneous classifiers is defined as follows. Let U be the transfer collection 124 having a set of unlabeled images. Let $C=\{C_1, C_2, \ldots, C_N\}$ be a set of N individual classifiers 122-1~122-N. An input image x is drawn from the transfer collection 124 (U) and input to the individual classifiers 122-1~122-N $\{C_1, C_2, \ldots, C_N\}$, where each individual classifier 122 ($C_i$) has been trained to predict the probability $p_i(Y=l_j)$ of an image belonging to class $l_j$ included in the individual class set $L_i$.

Given U and C, the goal is to train the unified classifier 126 ($C_U$) that estimates the probability $q(Y=l_j)$ of an input image belonging to the class $l_j$ included in the unified class set $L_U$ where:

$$L_U = \bigcup_{i=1}^{N} L_i = \{l_1, l_2, l_3, \ldots, l_L\}. \qquad \text{Formula 1}$$

Note that the individual classifier 122 ($C_i$) may be trained to classify different sets of target classes, i.e., thus one individual class set $L_i$ may not be equal to other individual class set $L_j$ and/or even the number of classes in one individual class set $|L_i|$ may not be equal to the number of classes in other individual class set $|L_j|$ when i is not j.

Generally, the knowledge distillation is a class of algorithms used for compressing multiple teacher models $C_i$ into a single model $C_U$ from a unlabeled data set U. Standard distillation corresponds to the case where all individual class sets are the same ($L_i=L_j$, $\forall(i, j)$) and the student model $C_U$ may be trained by minimizing the cross-entropy between the outputs $p_i$ of the teacher model $C_i$ and the output q of the student model $C_U$ as follow:

Formula 2

$$J(q) = -\sum_{i=1}^{N} \sum_{l \in L_U} p_i(Y=l) \log q(Y=l). \qquad (1)$$

Essentially, the outputs $p_i$ of the teacher model $C_i$ are used as soft labels for the unlabeled data set U in training the student model $C_U$. For neural networks, the probabilities are usually computed with a softmax function as follows:

Formula 3

$$p(Y=l) = \frac{\exp(z_l/T)}{\sum_{k \in L_U} \exp(z_k/T)}, \qquad (2)$$

where $z_l$ is a logit (activations before softmax) for class l, and T denotes an adjustable temperature parameter. Minimizing the cross-entropy shown in the equation (1) when T is appropriately high is similar to minimizing the L2 error between the logits of $p_i$ and q, thereby relating the cross-entropy minimizing to logit matching.

However, the main issue with the standard distillation stems from its inability to cope with the more general case where one individual class set $L_i$ may not be equal to other individual class set $L_j$. The aforementioned equation (1) assumes that the student model $C_U$ and the teacher models $C_i$ share the same set of target classes ($L_i=L_j,=L_U$).

However, in the heterogeneous classifiers, each teacher model $C_i$ is trained to predict classes in the individual class set $L_i$, thus $p_i(Y=l)$ is undefined for l included in a set $L_{-i}$ that is defined as a set of target classes in the unified class set $L_U$ but outside the individual class set $L_i$. A naive solution for inconsistency in outputs between the teacher model $C_i$ and the student model $C_U$ would be to simply set $p_i(Y=l)=0$ for l included in the set $L_{-i}$. However, such naive solution could incur errors, e.g., one may set $p_i(Y=cat)$ of a "cat" image to zero when the teacher model $C_i$ does not classify cats, which would be an improper supervision.

To overcome the limitation of the standard distillation, a probabilistic relation relating the output $p_i$ of each individual classifier 122 ($C_i$) and the output q of the unified classifier 126 ($C_U$) are introduced. Since the individual class set $L_i$ is a subset of the unified class set $L_U$, the probability $p_i(Y=l)$ is considered as the probability q of Y=l given that Y cannot be in $L_{-i}$. This leads to the following derivation:

Formula 4

$$p_i(Y = l) = q(Y = l \mid Y \notin L_{-i}) \qquad (3)$$

$$= q(Y = l \mid Y \in L_i) \qquad (4)$$

$$= \frac{q(Y = l, Y \in L_i)}{q(Y \in L_i)} \qquad (5)$$

$$= \frac{q(Y = l)}{\sum_{k \in L_i} q(Y = k)}. \qquad (6)$$

The equation (6) indicates equivalence between each prediction value $p_i(Y=l)$ in the output of one individual classifier 122 ($C_i$) and a corresponding prediction value $q(Y=l)$ in the output of the unified classifier 126 ($C_U$) normalized by the individual class set $L_i$ of the one individual trained model 122 ($C_i$).

Figure 3:
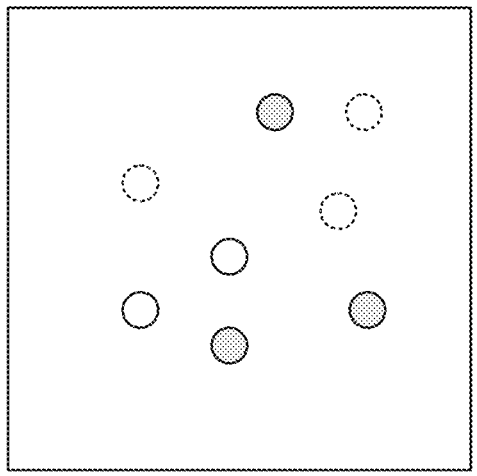
FIG. 3 describes intuitively a schematic of a probabilistic relation connecting outputs of individual classifiers and an output of a unified classifier according to the exemplary embodiment of the present invention.
Figure 3:
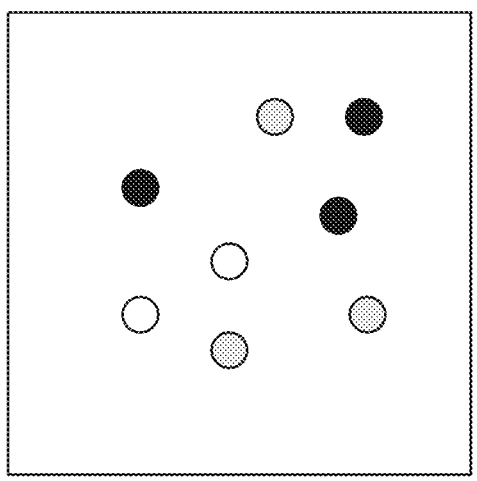

FIG. 3 describes a schematic of the probabilistic relation connecting the output of individual classifier 122 ($C_i$) and the output of the unified classifier 126 ($C_U$). As shown in FIG. 3, we can think of the individual classifier 122 ($C_i$) as outputting partial classes of the unified classifier 126 ($C_U$).

In the novel knowledge distillation according to one or more embodiments of the present invention, based on this probabilistic relation, two classes of techniques including cross-entropy minimization based technique and a matrix factorization based techniques with missing entries are provided. Both these techniques allow us to estimate the unified soft labels q from the unlabeled sample x over all classes in the unified class set $L_U$ and to use the unified soft labels q to train the unified classifier 126. More detail about the cross-entropy based technique and matrix factorization based technique will be described later.

In particular embodiments, each of modules 122, 126, 130 of the central computing system 120 described in FIG. 1 as well as each of submodules 132 and 134 of the knowledge distillation system 130 shown in FIG. 2 may be, but not limited to, implemented as a software module including program instructions and/or data structures in conjunction with hardware components such as a processing circuitry (e.g., CPU (Central Processing Unit), GPU (Graphic Processing Unit), FPGA (Field Programmable Gate Array)), a memory, etc.; as a hardware module including electronic circuitry (e.g., neuromorphic chip); or as a combination thereof.

These modules 122, 126, 130, 132 and 134 described in FIG. 1 and FIG. 2 may be implemented on a single computer system such as a personal computer and a server machine or a computer system distributed over a plurality of computing devices such as a computer cluster of the computing devices. The transfer collection 124 and the content of the individual classifiers 122-1~122-N may be stored in any internal or external storage device or medium that the central computing system 120 can access.

Also, each of modules 114, 116 in the data source 110 described in FIG. 1 may be, but not limited to, implemented as a software module; as a hardware module; or as a combination thereof. These modules 114, 116 described in FIG. 1 may be implemented on a single computer system or a computer system distributed over a plurality of computing devices. The training data collection 112 may be stored in any internal or external storage device or medium that a computer system implementing the module 114 can access.

Note that the individual classifier 122 is not necessary to be located on a local of a central computing system 120. It is sufficient if the individual classifier 122 is available through a network. Thus, preparing the individual classifier 122 means making the individual classifier 122 available by reading the individual classifier 122 onto a memory space of the local computer system; or establishing a connection with the individual classifier 122 that operates on a remote computer system such that the transfer data (sample) can be fed into the individual classifier 122 and a resulted prediction for the transfer data (sample) can be received therefrom.

Furthermore, in one or more embodiment, even an access to the individual classifier 122 from the central computing system 120 is not necessary. In this situation, the content of the transfer collection 124 is given to each data source 110 and the entity is requested to forward a soft label collection obtained by feeding each sample in the transfer collection 124 into the individual classifier 122 and its class names. Then, the knowledge distillation system 130 receives the soft label collection and the class names.

Figure 4:
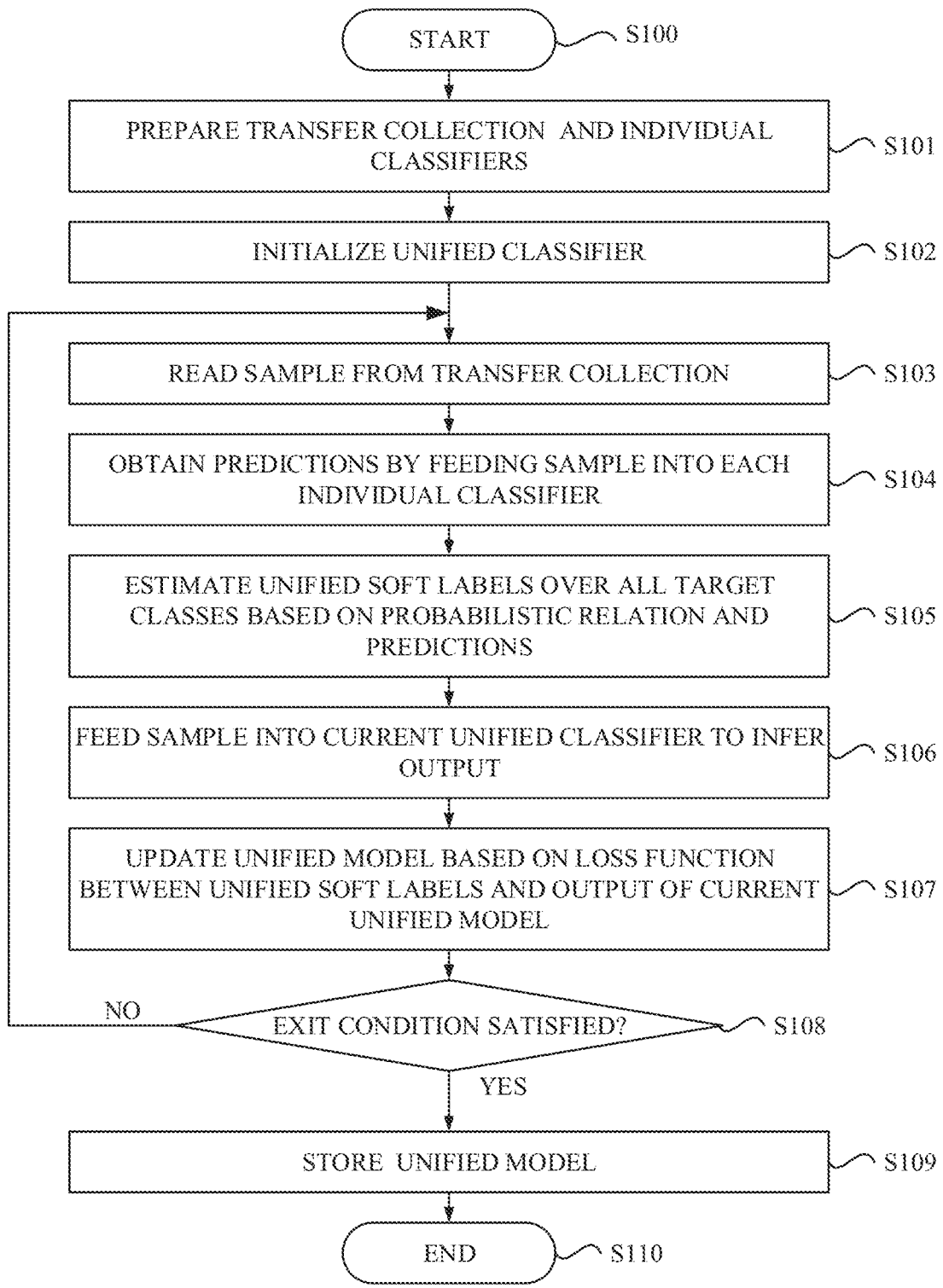
FIG. 4 is a flowchart depicting a knowledge distillation process for training a unified classifier with multiple individual classifiers according to an exemplary embodiment of the present invention.

With reference to FIG. 4, a flowchart depicting a knowledge distillation process for training a unified classifier 126 is depicted. As shown in FIG. 4, the process may begin at step S100 in response to receiving, from an operator, a request for initiating a knowledge distillation process. The set of the individual classifiers 122-1~122-N $\{C_1, C_2, \ldots, C_N\}$, the configuration of the unified classifier 126 ($C_U$) and the transfer collection 124 (U) may be designated in this request. Note that the process shown in FIG. 4 may be performed by processing circuitry such as one or more processing units in the central computing system 120.

At step S101, the processing circuitry may prepare the transfer collection 124 (U) and the individual classifiers 122-1~122-N $\{C_1, C_2, \ldots, C_N\}$ that have been already trained. At step S102, the processing circuitry may initialize the unified classifier 126. Each individual classifier 122 prepared at the step S101 has a corresponding individual class set $L_i$. whereas the unified classifier 126 prepared at the step S102 has the unified class set $L_U$, which is a union of the individual class sets $L_1$.

At step S103, the processing circuitry may read a sample x from the transfer collection 124 (U). At step S104, the processing circuitry may obtain a plurality of predictions $p_i$ by feeding the sample x into each individual classifier 122 ($C_i$). At step S105, the processing circuitry may estimate unified soft labels q over all target classes of the unified class set $L_U$ from the predictions $p_i$ using the aforementioned probabilistic relation.

Cross-Entropy Based Approach

Hereinafter, first method to estimate unified soft labels q, which is based on cross-entropy minimization, is described. Based on the probabilistic relation (6), the aforementioned cost function (1) can be generalized to the following cost function:

Formula 5

$$J(q) = -\sum_{i=1}^{N} \sum_{l \in L_i} p_i(Y = l) \log q_i{}^{\wedge}(Y = l), \qquad (7)$$

where:

$$q_i{}^{\wedge}(Y = l) = \log \frac{q(Y = l)}{\sum_{k \in L_i} q(Y = k)}. \qquad (8)$$

The difference between the aforementioned equations (1) and (7) lies in the normalization of the probability q. Specifically, the cross-entropy of each individual classifier 122 ($C_i$) is computed between the probability $p_i(Y=l)$ and the normalized probability $q_i^{\wedge}(Y=l)$ over the target classes in the individual class set $L_i$. According to the equation (7), arbitrarily defined values of $p_i(Y=l)$ for missing target classes $L_{-i}$ is not required.

Let us suppose there exists probability $p^-$ over all classes in the unified class set $L_U$ where:

$$p_i(Y = l) = \frac{p^-(Y = l)}{\sum_{k \in L_i} p^-(Y = k)}, \forall\, i, \qquad \text{Formula 6}$$

then $q=p^-$ is a global minimum of the cost function (7). This establishes the form of the global minimum of the cost function (7), and that minimizing the cost function (7) may give the true underlying probability $p^-$ if it exists.

When given a probability distribution q, the aforementioned cost function (7) measures an error between a plurality of reference probability distributions $p_i(Y=l)$, each of which corresponds to the prediction of one individual classifier 122 ($C_i$), and a plurality of normalized distributions $q_i^{\wedge}(Y=l)$, each of which is obtained by normalizing the given probability distribution q over target classes in each individual class set $L_i$. By minimizing the aforementioned cost function (7) with respect to the probability distribution q, the optimal distribution q is obtained as the unified soft labels over all target classes of the unified class set $L_U$. In the described embodiment, the cost function is used as an objective function, thus, a problem of optimizing the objective function is minimizing the cost function.

Minimizing the aforementioned cost function (7) can be transformed into a geometric program, which can then be converted to a convex problem and efficiently solved. In short, new temporary variables $u_l(\in R)$ are given to each class l included in the unified class set $L_U$ and each temporary variable $u_l$ is represented by a logarithm function of the probability q $(Y=l)$ (i.e., $u_l=\log q(Y=l)$). Thus, in a particular embodiment, the aforementioned equation (7) can be transformed into following equation:

Formula 7

$$J(\{u_l\}_l) = -\sum_{i=1}^{N} \sum_{l \in L_i} p_i(Y = l)\left(u_l - \log\left(\sum_{k \in L_i} \exp(u_k)\right)\right), \qquad (9)$$

which is convex in the temporary variables $\{u_l\}_l$ since this function is a sum of scaled and log-sum-exps of the new temporary variables $\{u_l\}_l$. The equation (9) can be minimized by using an appropriate method such as gradient descent. Since the probability distribution q is represented by a set of exponential functions of respective temporary variables $u_l$ (i.e., exp $(u_l)$) in the convex problem, once the optimal temporary variables $\{u_l\}_l$ are obtained, the optimal temporary variables $\{u_l\}_l$ are transformed by the aforementioned softmax function (2) into to q in a form of probability. The probability distribution q, accordingly the unified soft labels, can be obtained by solving this convex problem. Although the cross-entropy function is used as the objective function in the described embodiment, however, in other embodiment, Kullback-Leibler (KL) divergence may also be used as the objective function since the cross-entropy and the KL divergence are equivalent in the sense that they would provide the same solution when they are optimized, even though the KL divergence and the cross-entropy are different in general.

Matrix Factorization Based Approaches

Hereinafter, second class of approaches to estimate unified soft labels q, which is based on matrix factorization with missing entries, is described. It is possible to cast a problem of unifying heterogeneous classifier as a problem of filling an incomplete matrix of soft labels. Hereinafter, three ways of using matrix factorization to recover unified soft labels q from the set of the predictions $\{p_i\}_i$ are described.

Matrix Factorization in Probability Space

Let us consider a probability matrix $P \in [0, 1]^{L \times N}$ where $P_{li}$ (the element in row l and column i) is set to $p_i(Y=l)$ if l is included in the individual class set $L_i$ and zero (0) otherwise. The probability matrix P represents the predictions $p_i$ in a form of probability with missing entries. To account for these missing predictions, a mask matrix $M \in \{0, 1\}^{L \times N}$ is define, in which $M_{li}$ (the element in row l and column i) is one (1) if l is included in the individual class set $L_i$ and zero (0) otherwise. The mask matrix M represents an existence of a missing class in the individual class sets $L_i$.

Using the probabilistic relation between $p_i$ and q in the equation (6), the probability matrix P can be factorized into a masked product of vectors as:

Formula 8

$$M \odot P = M \odot (uv^\top) \qquad (10)$$

$$u = \begin{bmatrix} q(Y = l_1) \\ \vdots \\ q(Y = l_m) \end{bmatrix}, v = \begin{bmatrix} \frac{1}{\sum_{l \in L_1} q(Y = l)} \\ \vdots \\ \frac{1}{\sum_{l \in L_N} q(Y = l)} \end{bmatrix}, \qquad (11)$$

where a circled dot represents Hadamard product. Here, the vector u is an output vector containing the distribution q represented in a form of probability, and each element in the vector v contains a normalization factor for each individual trained model ($C_i$), thus the vector v is called as a normalization vector v.

In this form, the probability output vector u can be estimated by solving the following a rank-1 matrix completion problem:

Formula 9

$$\underset{u,v}{\text{minimize}} \|M \odot (P - uv^\top)\|_F^2 \quad (12)$$

$$\text{subject to } u^\top 1_L = 1 \quad (13)$$

$$v \geq 0_N, u \geq 0_L \quad (14)$$

where $\|.\|_F$ denotes Frobenius norm, and $0_k$ and $1_k$ denote vectors of zeros and ones of size k.

Here, the equation (12) represents a problem of optimizing an objective function with respect to the output vector u and the normalization vector v as variables, in which the objective function measures an error between the probability matrix P with missing entries and a product of the output vector u and the normalization vector v, with the mask matrix M. The constraint (14) ensures that the normalization vector v is non-negative. The constraint (13, 14) ensures that the output vector u is a probability vector. This formulation can be regarded as a non-negative matrix factorization, which may be solved by using Alternating Least Squares (ALS) method, for example, where the output vector u is normalized to sum to 1 in each iteration. Due to gauge freedom, this normalization in the vector u does not affect the cost function.

Matrix Factorization in Logit Space

As mentioned above, there is a relationship between minimizing cross-entropy and the L2 distance between the logits of the individual classifier 122 ($C_i$) and the unified classifier 126 ($C_U$). Hence, the low-rank matrix factorization can be applied to logits. This formulation is actually a generalization of logit matching. Let $z_l^i$ be a given logit output of class l of the individual classifier 122 ($C_i$), and u be logit output vector to be estimated. For algorithms besides neural networks, logits can be obtained from probability via $z_l^i = \log p_i(Y=1)$. Let us consider a logit matrix $Z \in \mathbb{R}^{L \times N}$, in which $Z_{li}$ (the element in row l and column i) is $z_l^i$ f l is included in the individual class set $L_i$ and zero (0) otherwise. The problem of estimating the logit output vector $u \in \mathbb{R}^L$ may be formulated as follow:

Formula 10

$$\underset{u,v,c}{\text{minimize}} \|M \odot (Z - uv^\top - 1_L c^\top)\|_F^2 + r(\|u\|_2^2 + \|v\|_2^2) \quad (15)$$

$$\text{subject to } v \geq 0_N \quad (16)$$

where the vector $c \in \mathbb{R}^N$ deals with shift in logits, which is then called as a logit shift vector c, and $r \in \mathbb{R}$ is a hyper-parameter controlling regularization.

The shift in logit values have no effect in the probability output, but different shifts of individual classifiers is handled to model it as matrix factorization. Here, optimizing the scaling vector $v \in \mathbb{R}^N$ is akin to optimizing the temperature of the logits from each individual classifier 122 ($C_i$), and the logit scaling vector v is constrained to be non-negative to prevent the logit sign flip, which could affect the probability.

The equation (15) represents a problem of optimizing an objective function with respect to the output vector u represented in a form of logits, the logit scaling vector v and the logit shift vector c as variables, in which the objective function measures an error between the logit matrix Z with missing entries and a product of the output vector u and the logit scaling vector v shifted by the logit shift vector c, with the mask matrix M. The problem defined by the aforementioned equation (15) may be solved by using ALS over vectors u, v, and c. Here, there is no constraint on the output vector u, so the output vector u is not normalized. The unified soft labels q in the probability space may be obtained from the output vector u using the aforementioned softmax function (2), in which $u_l$ and $q_l$ are considered as $z_l$ and p(Y=1). By recovering q from u, the obtained soft labels q can be used to train the unified classifier that accepts soft labels. In other embodiment, the obtained output vector u may be used directly to train the unified classifier that can output logits (e.g., neural networks with the final softmax layer removed) as other type of soft labels. Although the logit in the output vector u is different from the probability q in representation, the unified soft labels recited herein include the values in logit space.

Matrix Factorization in Logit Space with Fixed Scaling Vector v

While setting the vector v as a variable allows the aforementioned equation (15) to handle different scaling of logit. However, the gauge freedom in $uv^T$ may lead to arbitrary scaling in u as follows:

$$uv^T = (u/\alpha)(\alpha v^T) \text{ for } a \neq 0. \quad \text{Formula 11}$$

Next, while the regularization help prevent norms of the vector u and the vector v to be too large, it is difficult to set a single regularization hyper-parameter r that works well for all data in the transfer collection 124 (U). To combat these issues, another formulation of (15) can be proposed where the scaling vector v is fixed to be $1_N$. With the scaling factor v fixed, regularization of the vector u is not required since its scale is determined by Z. In addition, the new formulation is convex and can be solved to global optimality. The problem of estimating the logit output vector $u \in \mathbb{R}^L$ with fixed scaling vector may be formulated as follow:

Formula 12

$$\underset{u,c}{\text{minimize}} \|M \odot (Z - u 1_N^\top - 1_L c^\top)\|_F^2 \quad (17)$$

The equation (17) represents a problem of optimizing an objective function with respect to the output vector u represented in a form of logits and the logit shift vector c, in which the objective function measures an error between the logit matrix Z with missing entries and a product of the output vector u and the fixed scaling vector shifted by the logit shift vector c, with the mask matrix M. The problem defined by the aforementioned equation (17) may be solved with appropriate method such as gradient descent method over vectors u, and c. Also, the unified soft labels q in the probability space may be obtained from the output vector u in the logit space using the softmax function (2). Alternatively, the obtained output vector u may be used directly to train the unified classifier that can output logits, as other type of soft labels.

Referring back to FIG. 4, at step S106, the processing circuitry may feed the same sample into the current unified classifier 126 to infer an output $p_U$. At step S107, the processing circuitry may update the current unified classifier 126 based on a loss function between the unified soft labels q and the output $p_U$ of the current unified classifier 126.

In a particular embodiment, the loss function used for training the unified classifier 126 is represented as following cross-entropy function:

$$J(\theta) = -\sum_{l \in L_U} q(Y=l) \log p_U(Y=l), \quad \text{Formula 13}$$

where q represents the unified soft label estimated at step S105, which works as pseudo labels, $p_U$ represents output probability over classes in the unified class set of the current unified classifier 126 with parameters θ. In the exemplary embodiment, since unlabeled data is used as the transfer data to unify the individual classifier 122, thus no labor is necessary to label any data at the central computing system 120. However, when a hard label assigned to the transfer data is available, the hard label may be used to update the parameters θ of the unified classifier 126 during the training process in an alternating or simultaneous manner with the soft labels.

At step S108, the processing unit may determine whether an exit condition is satisfied or not. For example, when the predetermined number of epochs has been completed, the exit condition is determined to be satisfied. If the processing unit determines that the exit condition is not satisfied yet at step S108, the process may loop back to step S103 for further iteration. On the other hand, if the processing unit determines that the exit condition has been already satisfied at the step S108, the process may proceed to step S109. At step S109, the processing unit may store the current unified classifier 126 and the process may end at the step S110. Note that the iteration of the training may be performed for each transfer example (e.g., online training) or a predetermined set of transfer example (e.g., batch training, mini-batch training).

Figure 5:
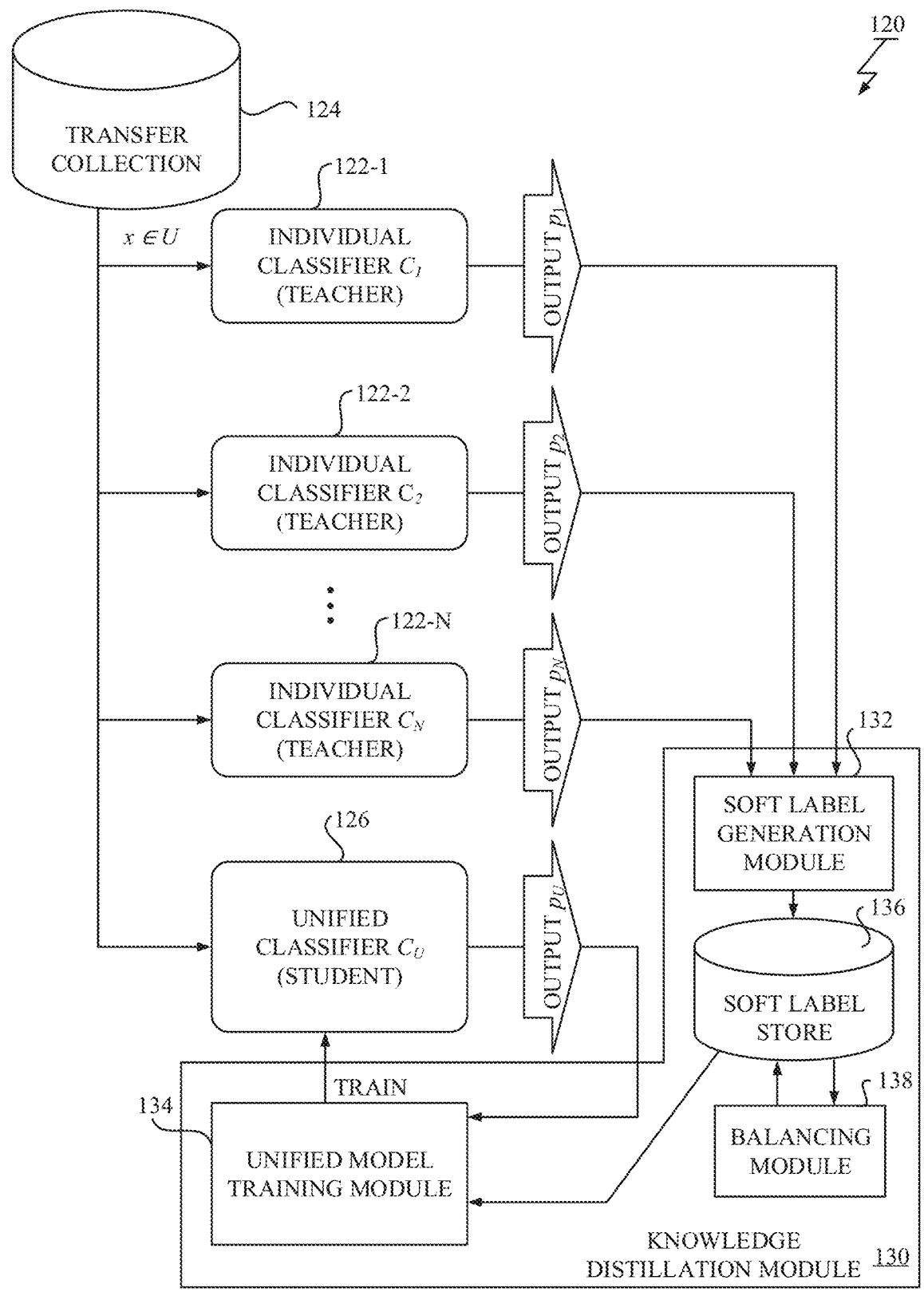
FIG. 5 illustrates a block diagram of a knowledge distillation system according to other exemplary embodiment of the present invention.

Hereinafter, referring to FIG. 5, a knowledge distillation system according to other exemplary embodiment of the present invention is described. FIG. 5 describes a block diagram of a knowledge distillation system according to other exemplary embodiment of the present invention. The difference between the embodiment shown in FIG. 2 and the embodiment shown in FIG. 5 is existence of a soft label store 136 and a balancing module 138 in the knowledge distillation system 130.

As described above, the unified soft labels q are estimated from a plurality of predictions $\{p_i\}_i$, for each sample x drawn from the transfer collection 124 (U) and used to train the unified classifier 126 ($C_U$). However, in some cases, the set of the estimated soft labels q from the whole of the transfer collection 124 (U) could be imbalance. That is the estimated unified labels q may favor certain classes more than others, which could lead to training the unified classifier 126 ($C_U$) to be biased towards the same sets of classes. To counter this bias, weightings can be applied to the cross-entropy loss when using the unified soft labels q to train the unified classifier 126 ($C_U$), where the weight of each class l is computed in a manner based on a static of the probability q(Y=l) over all data from the transfer collection 124 (U). An inverse of mean of the probability q(Y=l) over all data may be used as the static for the weighting.

In this exemplary embodiment, the soft label generation module 132 is further configured to store unified soft labels for each transfer data into the soft label store 136. After obtaining the soft labels for all transfer data in the transfer collection 124 (U), the balancing module 138 is configured to calculate the statics of the probability q(Y=l) over all data from the transfer collection 124(U) and save the statics as weightings. The unified model training module 134 is configured to weight the loss function by the weightings over the target classes in the unified class set in training the unified classifier 126.

According to the aforementioned embodiments, the unified soft labels q are estimated first and used to train the unified classifier 126 in a supervised manner. However, when the unified classifier 126 ($C_U$) is a neural network, there is an alternative way where the loss of estimating q is directly back-propagated throughout the neural network without having to estimate q first.

Hereinafter, referring to FIG. 6 and FIG. 7, a knowledge distillation in which data obtained from the individual classifiers 122-1~122-N is used to update the unified classifier 126 without having to estimate the unified soft labels q first, according to further other exemplary embodiment of the present invention is described.

FIG. 6 describes a block diagram of a knowledge distillation system according to the further other exemplary embodiment of the present invention. The difference between the embodiment shown in FIG. 2 and the embodiment shown in FIG. 6 is that the soft label generation module 132 shown in FIG. 2 is omitted and an update module 140 is incorporated into the unified model training module 134. Also note that the unified classifier 126 is neural network based model.

The update module 140 is configured to obtain, for each transfer data (or sample), the predictions $p_i$ generated by the individual classifiers 122-1~122-N. The update module 140 is also configured to feed each sample into the unified classifier 126 to infer predicted values over the target classes in the unified class set. The update module 140 is further configured to update the unified classifier 126 (its parameters θ) using the predicted values of the unified classifier 126 and the predictions of the individual classifiers 122-1~122-N for each sample with the aforementioned probabilistic relation, which connects the outputs of the individual classifiers 122-1~122-N and the output of the unified classifier 126 over the target classes in the unified class set $L_U$. When the training process is complete the unified model training module 134 stores the unified classifier 126 into an appropriate storage device.

With reference to FIG. 7, a flowchart depicting a knowledge distillation process according to the further other exemplary embodiment is depicted. As shown in FIG. 7, the process may begin at step S200 in response to receiving, from an operator, a request for initiating a knowledge distillation process. The process shown in FIG. 7 may be performed by processing circuitry such as one or more processing units in the central computing system 120.

At step S201, the processing circuitry may prepare the transfer collection 124 (U) and the individual classifiers 122-1~122-N $\{C_1, C_2, \ldots, C_N\}$. At step S202, the processing circuitry may initialize the unified classifier 126. At step S203, the processing circuitry may read a sample x from the transfer collection 124 (U). At step S204, the processing circuitry may obtain a plurality of predictions $p_i$ by feeding the sample x into each individual classifier 122 ($C_i$). At step S205, the processing circuitry may feed the same sample into the current unified classifier 126 to infer an output q.

At step S206, the processing circuitry may update the current unified classifier 126 based on a loss function with the aforementioned probabilistic relation from the prediction $p_i$ of individual classifiers 122-1~122-N and the output q of the current unified classifier 126 over all target classes.

In the case of the cross-entropy based approach, q in the equation (7) is considered as probability output from the current unified classifier 126 ($C_U$), then the loss can be back-propagate through directly. In step S206, the current unified classifier 126 is updated by back-propagating the loss throughout the neural network of the unified classifier 126 ($C_U$) based on the loss function (7) that measures an error between the reference distributions $p_i$ and the normalized distributions $q_i^-$ obtained by normalizing a distribution q over target classes in each individual class set, in which the distribution q is obtained as the predicted values inferred by the unified classifier 126 at step 205. The loss function (7) is used to update the parameters θ through the backpropagation in a form of using the gradient of the loss function.

In the case of matrix factorization approaches, the output vector u is considered as either the vector of probability or logit outputs from the unified classifier 126 ($C_U$). Once the output vector u is obtained, the output vector u is plugged into each formulation (12), (15) or (17) and the problem is solved for other variables (e.g., v and c) with the output vector u fixed, and then, the loss is back-propagated via the output vector u. The unified classifier 126 is updated by back-propagating a loss throughout the neural network, in which the loss is obtained by solving a problem of optimizing an objective function with an output vector u of the unified model and other variables (e.g. v and c) in a manner based on matrix factorization. The output vector u is obtained as the predicted values inferred by the unified classifier 126 and fixed in the problem. For example, let us consider the formulation (15). In this case, after obtaining the output vector u from the unified classifier 126 ($C_U$), the value of the output vector u in the formulation (15) is fixed, and then the objective function represented by the formulation (15) is optimized for the logit scaling vector v and the logit shift vector c until their optimal values are obtained. Then, the vectors v and c are fixed and the gradient of the equation (15) is computed with respect to the output vector u. Then this gradient can be used to back-propagate the unified classifier 126 ($C_U$).

In both approaches, directly back-propagating the loss helps to merge the step of estimating q and the step of using the estimated q to train the unified classifier 126 ($C_U$) into a single step. It prevents accumulation of error when estimating q from propagating toward the training of the unified classifier 126 ($C_U$).

At step S207, the processing unit may determine whether an exit condition is satisfied or not. If the processing unit determines that the exit condition is not satisfied yet at step S207, the process may loop back to step S203 for further iteration. On the other hand, if the processing unit determines that the exit condition has been already satisfied at the step S207, the process may proceed to step S208. At step S208, the processing unit may store the current unified classifier 126 and the process may end at the step S209.

According to one or more embodiments of the present invention, it is possible to transfer the knowledge of the individual trained models (the individual classifiers 122-1~122-N) to the unified model (the unified classifier 126) even though the individual trained models have different partial sets of target classes. The unified soft labels are estimated from the predictions generated by the individual trained models in a manner consistent with the output of the unified model, Furthermore, the unified model trained using the unified soft labels shows high performance, especially, comparable to a model that has been directly trained in a centralized and supervised manner with training data used for training the individual trained models, as will be described in the following experimental section. In contrast to ensemble methods, the individual trained models used to train the unified model are no longer needed for inference while the ensemble approaches require storing and running all models, which may lead to scalability issue when complex models are used. Training a new model allows reduction in computation cost compared with the ensemble methods. Also by introducing the probabilistic relation, a provision of improper supervision for missing target classes in the prediction of the individual trained model is avoided and it is possible to prevent the performance degradation of the unified model due to such improper supervision.

The aforementioned cross-entropy approach and the matrix factorization approaches provide practical solutions for solving the unified soft labels q from the predictions $p_i$ of the individual classifier 122.

Furthermore, in order to perform the novel knowledge distillation, data transfer of training data used to train the individual trained model is not required. The content of the individual trained model and the soft label collection obtained from the individual trained model are not raw data and are generally more compact than its training data. Also there is less restriction on the model architecture of the individual trained model. Thus, it is preferable in a situation where there is at least one of model architecture, computational, data availability and confidentiality constraints.

There may be practical applications for the cases when it is not possible to enforce every entity to use the same model/architecture; collect sufficient training data for all classes; or send data to the central node, due to computational, data availability, and confidentiality constraints.

According to the aforementioned embodiment, the novel knowledge distillation has been described in a context of image classification. However, the classifier to be trained by the novel knowledge distillation according to one or more embodiments of the present invention is not limited to the image classifier. In one or other embodiments, many applications can be contemplated, which include speech recognition, handwriting recognition, medical image analysis, pattern recognition, to name but a few.

Having described the advantages obtained with respect to the one or more specific embodiments according to the present invention, it should be understood that some embodiments may not have these potential advantages and these potential advantages are not necessarily required of all embodiments.

Experimental Study

Programs implementing the knowledge distillation system and knowledge distillation processes described with reference to the series of FIGS. 1-7 according to the exemplary embodiments were coded and executed.

The main experiments on ImageNet, LSUN and Places 365 datasets will be described. Hereinafter, the following abbreviation is used to denote the aforementioned methods:

SD for the naive extension of the standard distillation (Comparative Example 1), in which simply $p_i(Y=l)=0$ is set for l included in the set $L_{-i}$; CE-X for cross-entropy based methods (Examples 1-3); MF-P-X for matrix factorization on probability (Example 4-6); and MF-$L_U$-X and MF-LF-X for matrix factorization on logits with unfixed (Example 7-9) and fixed v (Example 10-12), respectively. In the aforementioned abbreviations, the suffix 'X' is replaced with 'E' if the unified soft label q are estimated first before using it to train the unified classifier 126 ($C_U$) (Examples 1, 4, 7, 10); with 'BP' if direct backpropagation from the loss function is performed (Examples 2, 5, 8, 11); and with 'BS' if the unified soft labels q is balanced by the inverse of the mean of the probability $q(Y=l)$ as the static before training the unified classifier 126 ($C_U$) (Examples 3, 6, 9, 12). In addition to the aforementioned methods, SD-BS is included as the SD method with balanced soft labels (Comparative Example 2), and SPV (Comparative Example 3) as the method trained directly in a supervised fashion with all labeled data of all individual classifiers 122 ($C_i$) is included as a benchmark. For MF-$L_U$-X methods, hyper-parameter r=0.01 was used. All methods used temperature T=3 to smooth the soft labels and logits.

First, the experiment protocols, details on the datasets, the architectures used as individual classifier 122 ($C_i$) and the unified classifier 126($C_U$), and the configurations of the individual classifier 122 ($C_i$) will be described. Then, the result will be discussed.

Experiment Protocols

Datasets: Three datasets were used. The first dataset is ImageNet (ILSVRC2012). This dataset contains 1 k classes with approximately 700 to 1300 training and 50 validation images per class, as well as 100 k unlabeled test images. In this experiment, the training images were used as training data for the individual classifiers 122-1~122-N($C_i$), the unlabeled test images were used as the transfer collection 124 (U), and the validation images were used as a test set to evaluate the accuracy. The second dataset is LSUN, which contains 10 classes with approximately 100 k to 3M training images (depending on the class) and 300 validation images per class with 10 k unlabeled test images. Here, a set of 1 k training images were sampled randomly per class to train the individual classifier 122 ($C_i$), a second randomly sampled set of 20 k images per class also from the training data was used as the transfer collection 124 (U), and the validation data was used as a test set. The third dataset is Places365. This dataset contains 365 classes with approximately 3 k to 5 k training and 100 validation images per class, as well as 329 k unlabeled test images. In this experiment, the training images were used as training data for the individual classifiers 122-1~122-N($C_i$), the unlabeled test images were used as the transfer collection 124 (U), and the validation images were used as a test set to evaluate the accuracy. All images were preprocessed by center cropping and scaling to 64×64 pixels.

Individual Classifier Configurations

The proposed methods were tested under two configurations of the individual classifiers (summarized in Table 1). (i) Random classes: For ImageNet dataset, in each trial, 20 to 50 classes were sampled as $L_U$ and 10 to 20 individual classifiers 122 ($C_i$) were trained where each was trained to classify 5 to 15 classes. For LSUN dataset, in each trial, 5 to 10 classes were sampled as $L_U$ and 3 to 7 individual classifiers 122 were trained where each was trained to classify 2 to 5 classes. This configuration was used as the main test for when the individual classifiers 122 ($C_i$) classify different sets of classes. For Places365 dataset, in each trial, 20 to 50 classes were sampled as $L_U$ and 10 to 20 individual classifiers 122 ($C_i$) were trained where each was trained to classify 5 to 15 classes. (ii) Completely overlapping classes: Here, the same configurations as in (i) was used except all individual classifiers 122 ($C_i$) were trained to classify all classes in $L_U$. This case is used to test the proposed methods under the common configurations where all classifiers $C_i$ and $C_U$ share the same classes. Under both configurations, the transfer collection 124 (U) consisted of a much wider set of classes than $L_U$. In other words, a large portion of the images in the transfer collection 124 (U) did not fall under any of the classes in $L_U$.

TABLE 1

| Dataset | # of classes in $L_u$ | # of Individual classifiers (N) | # of classes for each individual classifier | |
|---|---|---|---|---|
| | | | Random | Complete Overlapping |
| ImageNet | 20-50 | 10-20 | 5-15 | = L |
| LSUN | 5-10 | 3-7 | 2-5 | = L |
| Places365 | 20-50 | 10-20 | 5-15 | = L |

Models

Each individual classifier 122 ($C_i$) was randomly selected from one of the following four architectures with ImageNet Pre-trained weights: AlexNet, VGG16, ResNet18, and ResNet34. For AlexNet and VGG16, the weights of their feature extractor portion were fixed, their fc (fully connected) layers were replaced with two fc layers with 256 hidden nodes (with BatchNorm and ReLU), and the fc layers was trained with its training data. Similarly in ResNet models, their fc layers were replaced with two fc layers with 256 hidden nodes as above. In addition, the last residual block was fine-tuned. As for the unified classifier 126 ($C_U$), two models, including VGG16 and ResNet34, were used with similar settings as above.

For all datasets and configurations, each individual classifier 122 ($C_i$) was trained with 50 to 200 samples per class; no sample was shared between any individual classifiers 122 ($C_i$) in the same trial. These individual classifiers 122 ($C_i$) together with the transfer collection 124 (U) were then used to train the unified classifier 126 ($C_U$). All models were trained for 20 epochs with SGD (Stochastic Gradient Descent) optimizer (step sizes of 0.1 and 0.015 for first and latter 10 epochs with momentum 0.9). To control the variation in results, in each trial the unified classifier 126 ($C_U$) of the same architecture was initialized using the same weights and trained using the same batch order. The unified classifier 126 ($C_U$) of all methods was evaluated on the test data of all classes in L of its respective trial. 50 trials were run for each dataset, model, and the individual classifier configuration combination.

Result

The evaluated accuracy results are summarized in the following Table 2 and Table 3:

TABLE 2

| | Random Classes | | | | | |
|---|---|---|---|---|---|---|
| | ImageNet | | LSUN | | Places365 | |
| Method | VGG16 | ResNet34 | VGG16 | ResNet34 | VGG16 | ResNet34 |
| SPV | .7212 | .6953 | .6664 | .6760 | .5525 | .5870 |
| SD | .5543 | .5562 | .5310 | .5350 | .4390 | .4564 |
| CE-E | .6911 | .6852 | .6483 | .6445 | .5484 | .5643 |
| MF-P-E | .6819 | .6747 | .6443 | .6406 | .5349 | .5488 |
| MF-LU-E | .6660 | .6609 | .6348 | .6330 | .5199 | .5414 |
| MF-LF-E | .6886 | .6833 | .6490 | .6458 | .5441 | .5609 |
| CE-BP | .6902 | .6869 | .6520 | .6439 | .5466 | .5669 |
| MF-P-BP | .6945 | .6872 | .6480 | .6417 | .5471 | .5609 |
| MF-LU-BP | .6889 | .6847 | .6495 | .6389 | .5467 | .5681 |
| MF-LF-BP | .6842 | .6840 | .6523 | .6445 | .5383 | .5624 |
| SD-BS | .6629 | .6574 | .6343 | .6345 | .5283 | .5433 |
| CE-BS | .6928 | .6856 | .6513 | .6464 | .5548 | .5687 |
| MF-P-BS | .6851 | .6756 | .6474 | .6450 | .5455 | .5546 |
| MF-LU-BS | .6772 | .6682 | .6388 | .6357 | .5346 | .5497 |
| MF-LF-BS | .6935 | .6865 | <u>.6549</u> | .6485 | <u>.5544</u> | <u>.5692</u> |

TABLE 3

| | Completely Overlapping Classes | | | | | |
|---|---|---|---|---|---|---|
| | ImageNet | | LSUN | | Places365 | |
| Method | VGG16 | ResNet34 | VGG16 | ResNet34 | VGG16 | ResNet34 |
| SPV | .7345 | .7490 | .6769 | .7017 | .5960 | .6460 |
| SD | .7275 | .7292 | .7004 | .7041 | .6163 | .6402 |
| CE-E | .7276 | .7290 | .7002 | .7036 | .6162 | .6406 |
| MF-P-E | .7280 | .7297 | .7012 | .7052 | .6167 | <u>.6406</u> |
| MF-LU-E | <u>.7231</u> | .7242 | .7031 | .7043 | .6129 | .6374 |
| MF-LF-E | .7265 | .7279 | <u>.7015</u> | .7057 | .6161 | .6397 |
| CE-BP | .7275 | .7288 | .7003 | <u>.7040</u> | .6161 | .6400 |
| MF-P-BP | .7277 | .7287 | .6999 | .7019 | .6146 | .6384 |
| MF-LU-BP | .7229 | .7225 | .7001 | .7046 | .6113 | .6369 |
| MF-LF-BP | .7239 | .7252 | .7020 | .7034 | .6104 | .6366 |
| SD-BS | .7217 | .7214 | .6979 | .7017 | .6094 | .6320 |
| CE-BS | .7215 | .7213 | .6979 | .7018 | .6094 | .6323 |
| MF-P-BS | .7243 | .7252 | .6996 | .7041 | .6124 | .6355 |
| MF-LU-BS | .7168 | .7173 | .7014 | .7028 | .6063 | .6301 |
| MF-LF-BS | .7210 | .7215 | .6998 | .7035 | .6101 | .6330 |

Table 2 and Table 3 show accuracy of the methods over different combinations of individual classifier configurations, datasets and unified classifier models. Each column shows the average accuracy of each method under each experimental setting, where best result excluding SPV of each setting is shown in under line bold. To test statistical significance, Wilcoxon signed-rank test over standard deviation were chosen to cater for the vastly different settings (e.g., model architectures, number of classes and HCs, etc.) across trials. The test was run between the best performing method in each experiment and the rest. Methods where the performance is not statistically significantly different from the best method at $\alpha=0.01$ are shown in bold.

Hereinafter, the result for random class case, which addresses the main scenario of the proposed novel knowledge distillation when each individual classifier 122 was trained to classify different sets of classes, is described.

As shown in Table 2, all proposed methods (Examples 1-12) performed significantly better than SD (Comparative Example 1). All methods in estimating q methods with suffixes 'E' (Examples 1, 4, 7, 10), direct back-propagating methods with suffixes 'BP' (Examples 2, 5, 8, 11) and balancing methods with suffixes 'BS' (including SD-BS) (Examples 3, 6, 9, 12 and Comparative Example 2) of Table 2 outperformed SD (Comparative Example 1) by a large margin of 9-15%. It was shown that simply setting probability of undefined classes of each individual classifier to 0 may significantly deteriorate the accuracy. On the other hand, the proposed methods (Examples 1-12) achieved significantly better results and almost reached the same accuracy as SPV (Comparative Example 3) with a gap of 1-4%. This suggests the soft labels from the individual classifiers 122 ($C_i$) can be used for unsupervised training at a little expense of accuracy, even though the transfer collection 124 (U) contains a significant proportion of images that are not part of the target classes. Still, there are several factors that may affect the capability of the unified classifier 126 ($C_U$) from reaching accuracy of SPV, e.g., accuracy of the individual classifiers 122 ($C_i$), their architectures, etc.

It can be seen that different algorithms performed best under different settings, however, the matrix factorization on the logits with fixed v (Example 10-12), always performs best or has no statistical difference from the best methods.

This suggests the matrix factorization on logits with fixed v could be the best method for solving unifying heterogeneous classifier problem.

While the improvement may be marginal (less than 1.5%), the label balancing methods with suffix 'BS' (Examples 3, 6, 9, 12) consistently outperformed their counterparts with suffix 'E'(Examples 1, 4, 7, 10). These results indicate that it is a good idea to use the balanced soft labels to train the unified classifier 126 ($C_U$). Note that while SD-BS (Comparative Example 2) received significant boost, it still generally underperformed other CE and MF methods (Examples 1-12), suggesting that it is important to incorporate the relation between $\{p_i\}$, and q into training.

The methods with suffixes 'E' and 'BS' are based on estimating q before training the unified classifier 126 ($C_U$), while methods with suffix 'BP' directly performed backpropagation from the loss function. The losses of the cross-entropy (CE) and the matrix factorization on logits with fixed v (MF-LF) are convex in their variables while the matrix factorization on the probability (MF-P) and the matrix factorization on the logits with unfixed v (MF-LU) are nonconvex. Here, a small but interesting effect is observed, in which methods with convex losses performed better when q is estimated first than directly back-propagate the loss while nonconvex ones have an opposite result. This may be due the accumulation of error when q is estimated for nonconvex methods, which get passed down to then the unified classifier 126 ($C_U$) is trained, while nonconvex 'BP' methods might be able to avoid local such error accumulation. On the other hand, convex methods can estimate globally optimal q, thus using it to train the unified classifier 126 ($C_U$) may cause it to avoid bad local optima.

Next, we discuss the results of the completely overlapping case by referring to Table 3. All methods (Examples 1-12) performed rather equally well. It can be seen that all methods achieved about the same accuracy as SD (Comparative Example 1). This shows that the proposed methods can also perform well in the common cases of all individual classifier being trained to classify all classes and reinforces that the proposed methods are generalizations of knowledge distillation.

It can be noted that balancing soft labels tends to slightly deteriorate the accuracy. Here, even SD-BS (Comparative Example 2), which received an accuracy boost in random class case also performed worse than its counterpart SD (Comparative Example 1). This suggests not balancing soft labels may be a better option in this case.

For LSUN and Places365 datasets, it can be seen that all methods (Examples 1-12) performed better than SPV (Comparative Example 3). Especially for the case of VGG16, the SPV performed worse than other methods by 1 to 3% consistently in most of the 50 trials. This shows that it is possible that distillation-based methods may outperform their supervised counterparts.

Sensitivity Analysis

Furthermore, three sets of sensitivity analysis were performed on the effect of the size of the transfer set, the temperature parameter T, and the accuracy of the individual classifiers 122 ($C_i$). The same settings as the ImageNet random classes experiment was used with VGG16 as the unified classifier 126 ($C_U$). 50 trials were run for each test. The following five methods were evaluated as the representative set of SD and top performing methods from previous section: SD (Comparative Example 4), SD-BS (Comparative Example 5), MF-P-BP (Example 13), MF-LF-BS (Example 14), and CE-BS (Example 15).

Figure 8A:
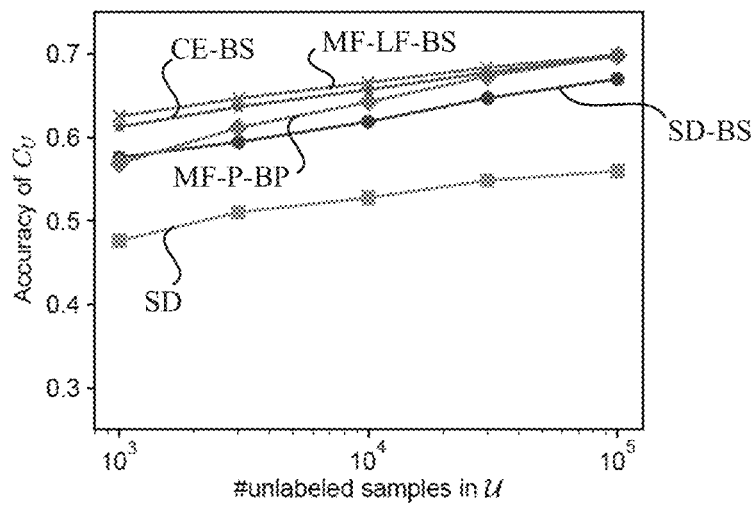
FIG. 8 shows sensitivity analysis results: (A) Size of unlabeled set, (B) Temperature and (C) Accuracy of the individual classifiers.

Size of transfer set: The test to evaluate the effect of the number of unlabeled samples in the transfer set U was used. The number of samples was varied from $10^3$ to $10^5$. The result is shown in FIG. 8A. As expected, it can be seen that all methods deteriorate as the size of transfer set decreases. In this test, MF-P-BP (Example 13) is the most affected by the decrease as it accuracy drops fastest. Still, all other methods (Examples 13-15) perform better than SD in the whole test range, illustrating the robustness to transfer sets with different sizes.

Figure 8B:
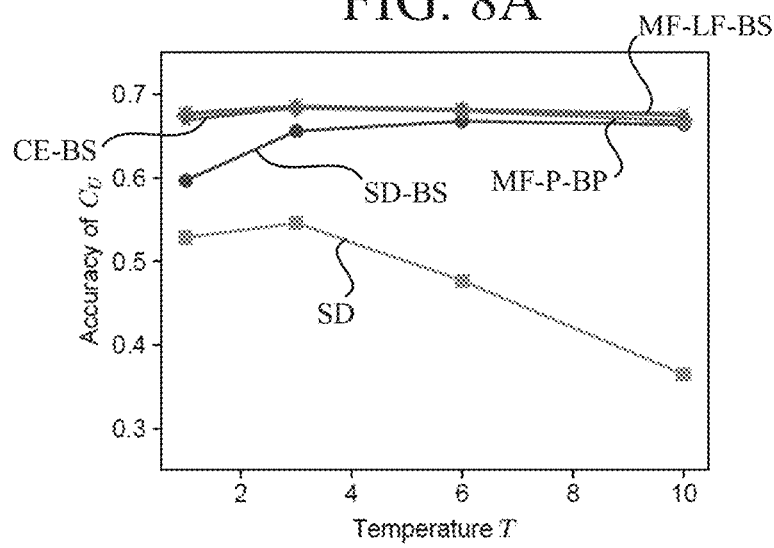

Temperature: In this test, the temperature T used for smoothing the probability $\{p_i\}_i$ was varied before using them to estimate q or train $C_U$. The values evaluated are T=1, 3, 6; and 10. The result is shown in FIG. 8B. It can be seen that the accuracies of SD and SD-BS (Comparative Examples 4-5) drop significantly when T is set to high and low values, respectively. On the other hand, the other three methods (Examples 13-15) are less affected by different values of T.

Figure 8C:
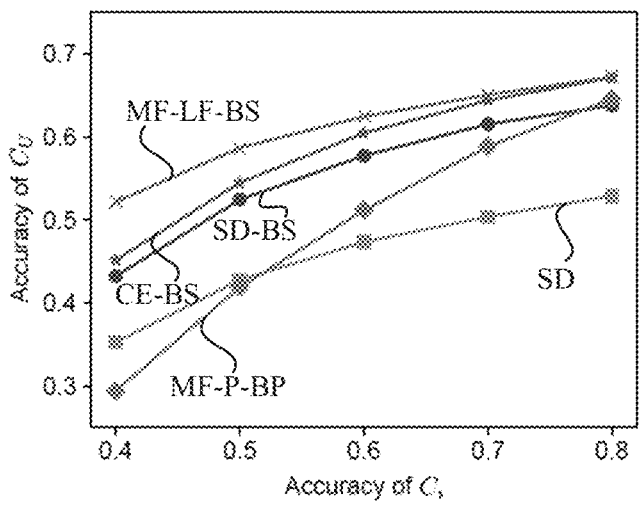

Accuracies of individual classifiers: In this test, the robustness of the methods was evaluated against varying accuracy of the individual classifiers 122 ($C_i$). The test protocol is as follows: In each trial, the accuracy of the all individual classifiers 122 ($C_i$) was varied to 40-80%, $p_i$ was obtained from the individual classifiers 122 ($C_i$), and used to perform the method. To vary the accuracy of each individual classifiers 122 ($C_i$), 50 samples were took per class from training data as the adjustment set, completely train each individual classifiers 122 ($C_i$) from the remaining training data, then inject increasing Gaussian noise into the last fc layer until its accuracy on the adjustment set drops to the desired value. If the initial accuracy of individual classifiers 122 ($C_i$) is below the desired value then the initial $C_i$ was simply used. The result of this evaluation is shown in FIG. 8C. It can be seen that the accuracy of all methods (Examples 13-15) increase as the individual classifiers 122 ($C_i$) and perform better, illustrating that the accuracy of individual classifiers 122 ($C_i$) is a notable factor for the performance. It can also be seen that MF-P-BP (Example 13) is most affected by low accuracy of individual classifiers 122 ($C_i$) while MF-LF-BS (Example 14) is the most robust.

Based on the sensitivity analysis, it was demonstrated that MF-LF-BS (Example 14) is the most robust method against the number of samples in the transfer set, temperature, and accuracy of the individual classifiers 122. This result provides further evidence that MF-LF-BS is our suggested method.

Computer Hardware Component

Figure 9:
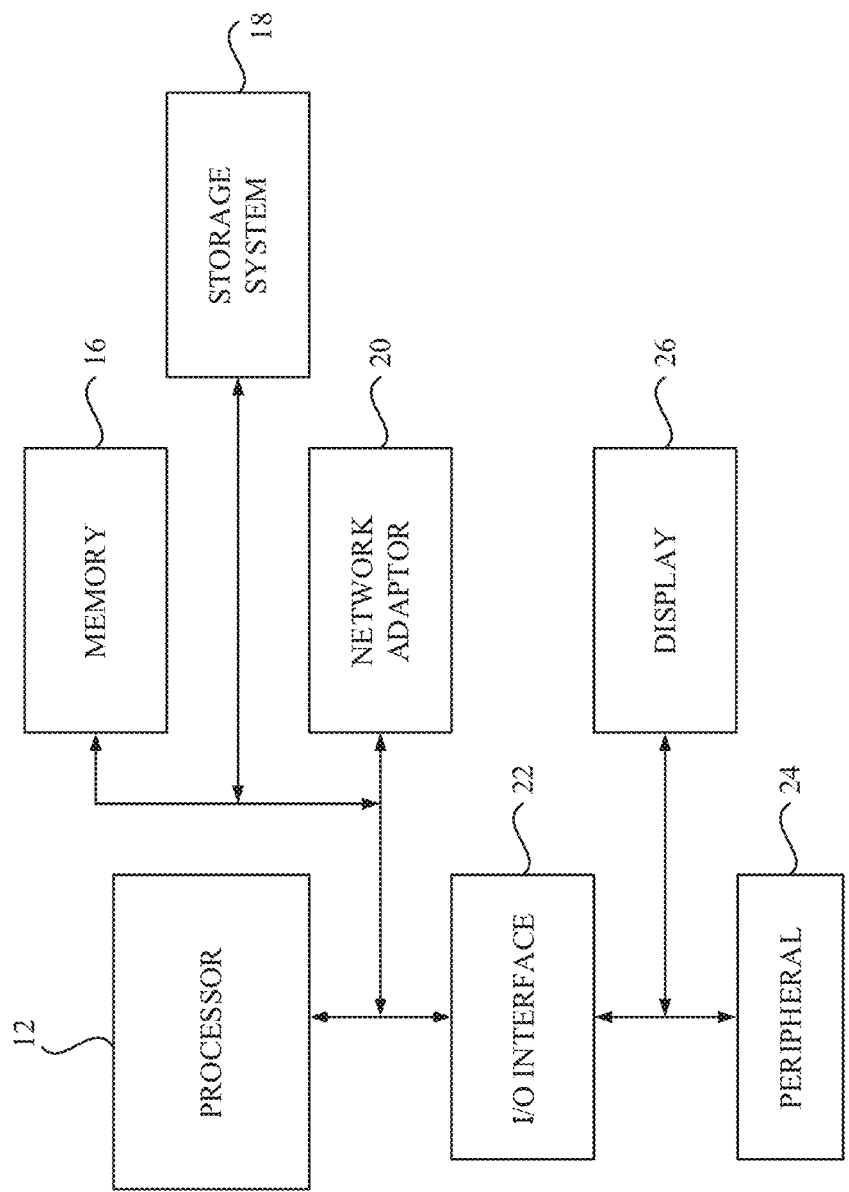
FIG. 9 depicts a schematic of a computer system according to one or more embodiments of the present invention.

Referring now to FIG. 9 a schematic of an example of a computer system 10, which can be used for the central computing system 120 and other computing system for data sources 110, is shown. The computer system 10 shown in FIG. 9 is implemented as computer system. The computer system 10 is only one example of a suitable processing device and is not intended to suggest any limitation as to the scope of use or functionality of embodiments of the invention described herein. Regardless, the computer system 10 is capable of being implemented and/or performing any of the functionality set forth hereinabove.

The computer system 10 is operational with numerous other general purpose or special purpose computing system environments or configurations. Examples of well-known computing systems, environments, and/or configurations that may be suitable for use with the computer system 10 include, but are not limited to, personal computer systems, server computer systems, thin clients, thick clients, hand-held or laptop devices, in-vehicle devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system 10 may be described in the general context of computer system-executable instructions, such as program modules, being executed by a computer system. Generally, program modules may include routines, programs, objects, components, logic, data structures, and so on that perform particular tasks or implement particular abstract data types.

As shown in FIG. 9 the computer system 10 is shown in the form of a general-purpose computing device. The components of the computer system 10 may include, but are not limited to, a processor (or processing circuitry) 12 and a memory 16 coupled to the processor 12 by a bus including a memory bus or memory controller, and a processor or local bus using any of a variety of bus architectures.

The computer system 10 typically includes a variety of computer system readable media. Such media may be any available media that is accessible by the computer system 10, and it includes both volatile and non-volatile media, removable and non-removable media.

The memory 16 can include computer system readable media in the form of volatile memory, such as random access memory (RAM). The computer system 10 may further include other removable/non-removable, volatile/non-volatile computer system storage media. By way of example only, the storage system 18 can be provided for reading from and writing to a non-removable, non-volatile magnetic media. As will be further depicted and described below, the storage system 18 may include at least one program product having a set (e.g., at least one) of program modules that are configured to carry out the functions of embodiments of the invention.

Program/utility, having a set (at least one) of program modules, may be stored in the storage system 18 by way of example, and not limitation, as well as an operating system, one or more application programs, other program modules, and program data. Each of the operating system, one or more application programs, other program modules, and program data or some combination thereof, may include an implementation of a networking environment. Program modules generally carry out the functions and/or methodologies of embodiments of the invention as described herein.

The computer system 10 may also communicate with one or more peripherals 24 such as a keyboard, a pointing device, a car navigation system, an audio system, etc.; a display 26; one or more devices that enable a user to interact with the computer system 10; and/or any devices (e.g., network card, modem, etc.) that enable the computer system 10 to communicate with one or more other computing devices. Such communication can occur via Input/Output (I/O) interfaces 22. Still yet, the computer system 10 can communicate with one or more networks such as a local area network (LAN), a general wide area network (WAN), and/or a public network (e.g., the Internet) via the network adapter 20. As depicted, the network adapter 20 communicates with the other components of the computer system 10 via bus. It should be understood that although not shown, other hardware and/or software components could be used in conjunction with the computer system 10. Examples, include, but are not limited to: microcode, device drivers, redundant processing units, external disk drive arrays, RAID systems, tape drives, and data archival storage systems, etc.

Computer Program Implementation

The present invention may be a computer system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more aspects of the present invention has been presented for purposes of illustration and description, but is not intended to be exhaustive or limited to the invention in the form disclosed.

Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for generating unified soft labels for training a unified model, the computer-implemented method comprising:
preparing a collection of samples;
obtaining, for each sample, a plurality of predictions generated by a plurality of individual trained models, each individual trained model having an individual class set to form at least part of a unified class set of a unified model, the unified class set including a plurality of target classes;
estimating, for each sample, unified soft labels over the plurality of target classes in the unified class set from the plurality of the predictions using a relation connecting a first output of each individual trained model and a second output of the unified model, wherein the second output is obtained by feeding each sample into the unified model to infer predicted values over the plurality of target classes, and wherein the relation indicates equivalence between each predicted value in the first output of the one individual trained model and a corresponding predicted value in the second output of the unified model normalized by the individual class set of the one individual trained model; and
outputting the unified soft labels to train the unified model having the unified class set.

2. The computer-implemented method of claim 1, wherein the computer-implemented method comprises:
updating the unified model based on a loss function between the unified soft labels and the predicted values for each sample; and
storing the unified model updated.

3. The computer-implemented method of claim 2, wherein the loss function is weighted by weightings over the target classes in the unified class set, each weighting for one target class being computed in a manner based on a statistic of the unified soft labels on the one target class through the collection.

4. The computer-implemented method of claim 1, wherein the unified soft labels are estimated by solving a problem of optimizing an objective function with respect to a distribution q corresponding to the second output of the unified model, the objective function measuring an error between a plurality of reference distributions pi corresponding to the plurality of the predictions and a plurality of normalized distributions qi each obtained by normalizing the distribution q over target classes in each individual class set.

5. The computer-implemented method of claim 4, wherein the distribution q is obtained by:
solving a convex problem with temporary variables u each given to each target class l in the unified class set $L_U$, the distribution q being represented by a set of exponential functions of respective temporary variables $u_l$ in the convex problem; and
transforming solved temporary variables $u_l$ into the distribution q.

6. The computer-implemented method of claim 4, wherein the objective function is a cross-entropy function.

7. The computer-implemented method of claim 1, wherein the unified soft labels are estimated by solving a problem of optimizing an objective function with respect to at least an output vector u representing the second output of the unified model as variables in a manner based on matrix factorization, the unified soft labels being represented in a form of probability or logits.

8. The computer-implemented method of claim 7, wherein the output vector u is represented in a form of probability and the problem of optimizing the objective function is solved further with respect to a normalization vector v representing normalization factors for the individual trained models, the objective function measuring an error between a probability matrix P representing the plurality of the predictions $p_i$ in a form of probability with missing entries and a product of the output vector u and the normalization vector v, with a mask matrix M representing an existence of a missing class in the individual class sets.

9. The computer-implemented method of claim 7, wherein the output vector u is represented in a form of logits and the problem of optimizing the objective function is solved further with respect to a logit scaling vector v and a logit shift vector c, the objective function measuring an error between a logit matrix Z representing the plurality of the predictions $p_i$ in a form of logits with missing entries and a product of the output vector u and the logit scaling vector v shifted by the logit shift vector c, with a mask matrix M representing an existence of missing class in the individual class sets.

10. The computer-implemented method of claim 7, wherein:
the output vector u is represented in a form of logits, and
the problem of optimizing the objective function is solved further with respect to a logit shift vector c, the objective function measuring an error between a logit matrix Z representing the plurality of the predictions $p_i$ in a form of logits with missing entries and a product of the output vector u and a fixed scaling vector v shifted by the logit shift vector c, with a mask matrix M representing an existence of missing class in the individual class sets.

11. The computer-implemented method of claim 1, wherein each of the unified model and the individual trained models is selected from a group consisting of neural network based classification models, decision tree or forest based classification models, and support vector machine based classification models.

12. The computer-implemented method of claim 1, wherein the computer-implemented method comprises:
receiving, for each of the plurality of the individual trained models, (i) a content of individual trained model itself or (ii) a soft label collection obtained by feeding each sample into the individual trained model, together with a content of the individual class set.

13. A computer-implemented method for training a unified model, the computer-implemented method comprising:
preparing a collection of samples;
obtaining, for each sample, a plurality of predictions generated by a plurality of individual trained models, each individual trained model having an individual class set to form at least part of a unified class set of a unified model, the unified class set including a plurality of target classes; and
updating the unified model having the unified class set using the plurality of the predictions for each sample and a relation connecting a first output of each individual trained model and a second output of the unified model, wherein the second output is obtained by feeding each sample into the unified model to infer predicted values over the plurality of target classes in the unified class set, and wherein the relation indicates equivalence between each predicted value in the first output of one individual trained model and a corresponding predicted value in the second output of the unified model normalized by the individual class set of the one individual trained model.

14. The computer-implemented method of claim 13, wherein the unified model includes a neural network and the unified model is updated by back-propagating a loss throughout the neural network, the loss measuring an error between a plurality of reference distributions $p_i$ corresponding to the plurality of the predictions and a plurality of normalized distributions $q_i$ obtained by normalizing a distribution q over target classes in each individual class set, the distribution q being obtained as the predicted values inferred by the unified model.

15. The computer-implemented method of claim 13, wherein the unified model includes a neural network and the unified model is updated by back-propagating a loss throughout the neural network, the loss being obtained by solving a problem of optimizing an objective function with an output vector u representing the second output of the unified model and other variables in a manner based on matrix factorization, the output vector u being obtained as the predicted values inferred by the unified model and fixed in the problem.

16. A computer system for generating unified soft labels for training a unified model, the computer system comprising:
a memory storing program instructions;
a processing circuitry in communications with the memory for executing the program instructions, wherein the processing circuitry is configured to:
prepare a collection of samples;
obtain, for each sample, a plurality of predictions generated by a plurality of individual trained models, wherein each individual trained model has an individual class set to form at least part of a unified class set of a unified model, the unified class set including a plurality of target classes;
estimate, for each sample, unified soft labels over the plurality of target classes in the unified class set from the plurality of the predictions using a relation connecting a first output of each individual trained model and a second output of the unified model, wherein the second output is obtained by feeding each sample into the unified model to infer predicted values over the plurality of target classes, and wherein the relation indicates equivalence between each predicted value in the first output of the one individual trained model and a corresponding predicted value in the second output of the unified model normalized by the individual class set of the one individual trained model; and output the unified soft labels to train the unified model having the unified class set.

17. The computer system of claim 16, wherein the unified soft labels are estimated by solving a problem of optimizing an objective function with respect to a distribution q corresponding to the second output of the unified model, the objective function measuring an error between a plurality of reference distributions $p_i$ corresponding to the plurality of the predictions and a plurality of normalized distributions $q_{\tilde{i}}$ each obtained by normalizing the distribution q over target classes in each individual class set.

18. The computer system of claim 16, wherein the unified soft labels are estimated by solving a problem of optimizing an objective function with respect to at least an output vector u representing the second output of the unified model as variables in a manner based on matrix factorization, the unified soft labels being represented in a form of probability or logits.

19. A computer system for training a unified model, the computer system comprising:
   a memory storing program instructions;
   a processing circuitry in communications with the memory for executing the program instructions, wherein the processing circuitry is configured to:
   prepare a collection of samples;
   obtain, for each sample, a plurality of predictions generated by a plurality of individual trained models, wherein each individual trained model has an individual class set to form at least part of a unified class set of a unified model, the unified class set including a plurality of target classes; and
   update the unified model having the unified class set using the plurality of the predictions for each sample and a relation connecting a first output of each individual trained model and a second output of the unified model, wherein the second output is obtained by feeding each sample into the unified model to infer predicted values over the plurality of target classes in the unified class set, and wherein the relation indicates equivalence between each predicted value in the first output of one individual trained model and a corresponding predicted value in the second output of the unified model normalized by the individual class set of the one individual trained model.

20. The computer system of claim 19, wherein the unified model includes a neural network and the unified model is updated by back-propagating a loss throughout the neural network, the loss measuring an error between a plurality of reference distributions $p_i$ corresponding to the plurality of the predictions and a plurality of normalized distributions $q_{\tilde{i}}$ obtained by normalizing a distribution q over target classes in each individual class set, the distribution q being obtained as the second output of the unified model.

21. The computer system of claim 19, wherein the unified model includes a neural network and the unified model is updated by back-propagating a loss throughout the neural network, the loss being obtained by solving a problem of optimizing an objective function with an output vector u representing the second output of the unified model and other variables in a manner based on matrix factorization, the output vector u being obtained as the second output of the unified model and fixed in the problem.

22. A computer program product for generating unified soft labels for training a unified model, the computer program product comprising a computer readable storage medium having program instructions embodied therewith, the program instructions executable by a computer to cause the computer to perform a method comprising:
   preparing a collection of samples;
   obtaining, for each sample, a plurality of predictions generated by a plurality of individual trained models, each individual trained model having an individual class set to form at least part of a unified class set of a unified model, the unified class set including a plurality of target classes;
   estimating, for each sample, unified soft labels over the plurality of target classes in the unified class set from the plurality of the predictions using a relation connecting a first output of each individual trained model and a second output of the unified model, wherein the second output is obtained by feeding each sample into the unified model to infer predicted values over the plurality of target classes, and wherein the relation indicates equivalence between each predicted value in the first output of the one individual trained model and a corresponding predicted value in the second output of the unified model normalized by the individual class set of the one individual trained model; and
   outputting the unified soft labels to train the unified model having the unified class set.

* * * * *